United States Patent
Yin et al.

(10) Patent No.: US 12,548,281 B2
(45) Date of Patent: Feb. 10, 2026

(54) TARGET DETECTION METHOD AND APPARATUS

(71) Applicant: SHENZHEN YINWANG INTELLIGENT TECHNOLOGIES CO., LTD., Shenzhen (CN)

(72) Inventors: Xiaomeng Yin, Shanghai (CN); Huiqiao Su, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 509 days.

(21) Appl. No.: 17/985,479

(22) Filed: Nov. 11, 2022

(65) Prior Publication Data

US 2023/0072730 A1 Mar. 9, 2023

Related U.S. Application Data

(63) Continuation of application No. PCT/CN2021/081090, filed on Mar. 16, 2021.

(30) Foreign Application Priority Data

May 14, 2020 (CN) .......................... 202010408685.9

(51) Int. Cl.
*G06V 10/20* (2022.01)
*G06V 10/24* (2022.01)
(Continued)

(52) U.S. Cl.
CPC ............ *G06V 10/255* (2022.01); *G06V 10/24* (2022.01); *G06V 10/25* (2022.01); *G06V 10/443* (2022.01); *G06V 10/82* (2022.01); *G06V 2201/07* (2022.01)

(58) Field of Classification Search
CPC .... G06V 10/255; G06V 10/25; G06V 10/443; G06V 10/24; G06V 10/82; G06V 2201/07
(Continued)

(56) References Cited

U.S. PATENT DOCUMENTS 8,553,931 B2 * 10/2013 Kim ...................... G06V 40/28
382/103
2010/0021010 A1 1/2010 Zhang et al.
(Continued)

FOREIGN PATENT DOCUMENTS

CN 107862287 A 3/2018
CN 109583321 A 4/2019
(Continued)

OTHER PUBLICATIONS

Extended European Search Report in European Appln No. 21803599.6, dated Sep. 20, 2023, 8 pages.
(Continued)

*Primary Examiner* — Michael R Neff
(74) *Attorney, Agent, or Firm* — Fish & Richardson P.C.

(57) ABSTRACT

Embodiments of this application provide example target detection methods and apparatuses. One target detection method includes obtaining an image by using a photographing apparatus. A region of interest can be marked in the image based on a parameter of the photographing apparatus and a preset traveling path. The image can be detected by using a target detection algorithm to obtain a category to which a target object in the image belongs, a first location region of the target object in the image, and a confidence of the category. The confidence of the category can be modified, based on a relative location relationship between the first location region and the region of interest, to obtain a first confidence.

20 Claims, 12 Drawing Sheets

(51) Int. Cl.
      *G06V 10/25*      (2022.01)
      *G06V 10/44*      (2022.01)
      *G06V 10/82*      (2022.01)

(58) Field of Classification Search
      USPC .......................................................... 382/103
      See application file for complete search history.

(56)                References Cited

U.S. PATENT DOCUMENTS

2012/0300078 A1   11/2012  Ogata et al.
2015/0091715 A1    4/2015  Nomura
2017/0053169 A1    2/2017  Cuban et al.
2017/0316333 A1*  11/2017  Levinson ................ G06N 20/00
2021/0027485 A1*   1/2021  Zhang ........................ G06T 7/11
2021/0390291 A1*  12/2021  Sameer ................ G06V 40/103

FOREIGN PATENT DOCUMENTS

CN         110866420 A      3/2020
EP          2889641 A1      7/2015

OTHER PUBLICATIONS

International Search Report and Written Opinion in International Appln. No. PCT/CN2021/081090, mailed on Jun. 23, 2021, 15 pages (with English translation).

\* cited by examiner

TARGET DETECTION METHOD AND APPARATUS

CROSS-REFERENCE TO RELATED APPLICATIONS

This application is a continuation of International Application No. PCT/CN2021/081090, filed on Mar. 16, 2021, which claims priority to Chinese Patent Application No. 202010408685.9, filed on May 14, 2020. The disclosures of the aforementioned applications are hereby incorporated by reference in their entireties.

TECHNICAL FIELD

Embodiments of this application relate to the field of artificial intelligence technologies, and in particular, to a target detection method and apparatus.

BACKGROUND

With the development of science and technology, an artificial intelligence (AI, Artificial Intelligence) technology is rapidly improved. In some artificial intelligence technologies, a machine learning method is generally used to construct initial models of various structures, such as a neural network model, a support vector machine model, and a decision tree model. Then, the various initial models are trained to achieve objectives such as image recognition and natural language processing. Image recognition further includes recognition of text presented in an image and target detection of each object presented in the image.

In a related target detection technology, in a scenario in which a small target needs to be detected, such as an autonomous driving scenario, during detection of a target that is relatively far away on a road or a relatively small target, effective identification generally cannot be performed. For example, a pedestrian identifier on a remote direction board is identified as a pedestrian on the road.

Therefore, how to effectively identify a small target in an image becomes a problem that needs to be resolved.

SUMMARY

In a target detection method and apparatus shown in this application, a probability that an error occurs during identification of a small target in an image can be reduced, and this helps improve detection accuracy of target detection.

To achieve the foregoing objective, the following technical solutions are used in this application.

According to a first aspect, an embodiment of this application provides a target detection method. The target detection method is applied to an electronic device, and the target detection method includes: obtaining an image by using a photographing apparatus; marking a region of interest in the image based on a parameter of the photographing apparatus and a preset traveling path; detecting the image by using a target detection algorithm, to obtain a category to which a target object in the image belongs, a first location region of the target object in the image, and a confidence of the category to which the target object belongs; and modifying, based on a relative location relationship between the first location region and the region of interest, the confidence of the category to which the target object belongs, to obtain a first confidence.

The first confidence of the category to which the detected target object belongs is determined by using the location relationship between the location region in which the detected target object is located and the region of interest, to further verify whether the category to which the detected target object belongs is correct, and filter out some category detection results that are illogical or that do not conform to common sense, so that accuracy of target detection is improved.

Based on the first aspect, when the first confidence is less than a preset threshold, the first confidence may be directly output. When the first confidence is less than the preset threshold, the target detection method further includes: determining a second location region in the image based on the parameter of the photographing apparatus, boundary coordinates of the first location region in the image, and a preset size of the object corresponding to the category in the real world; detecting an error between the first location region and the second location region; and modifying the first confidence based on the error, to obtain a second confidence of the category to which the target belongs.

The first confidence is modified by using the error between the second location region and the first location region, so that a situation in which a target object on a road is misjudged (for example, a distant tree on the road is misjudged as a pedestrian) can be further reduced, and therefore, accuracy of detecting the target object can be further improved.

In a possible implementation, the parameter of the photographing apparatus includes at least one of the following: a focal length of the photographing apparatus, a distance between the photographing apparatus and a reference plane, a transformation matrix for transforming a coordinate system of the photographing apparatus into an image coordinate system, and a size of a photosensitive unit in a photosensitive element.

In a possible implementation, the determining a second location region in the image based on the parameter of the photographing apparatus, boundary coordinates of the first location region in the image, and a size of the object corresponding to the category in the real world includes: determining a distance between the photographing apparatus and the target object based on the focal length of the photographing apparatus, the distance between the photographing apparatus and the reference plane, the transformation matrix for transforming the coordinate system of the photographing apparatus into the image coordinate system, the size of the photosensitive unit in the photosensitive element, and the boundary coordinates of the first location region in the image; and determining the second location region in the image based on the distance between the photographing apparatus and the target object, the size of the object corresponding to the detected category in the real world, the distance between the photographing apparatus and the reference plane, and the boundary coordinates of the first location region.

In a possible implementation, the category to which the target object belongs is selected from preset candidate categories based on a matching result obtained after matching a feature of the target object with features of a plurality of objects corresponding to the preset candidate categories.

Based on the first aspect, in a possible implementation, the target detection algorithm may be a pre-trained target detection model. The detecting the image by using a target detection algorithm, to obtain a category to which a target object in the image belongs, a first location region of the target object in the image, and a confidence of the category to which the target object belongs includes: setting a marking parameter in the pre-trained target detection model, where the marking parameter is used to indicate that the target detection model marks a plurality of candidate regions in the image; and inputting the image to the target detection model to obtain an output result of the target detection model, where the output result is used to indicate whether an object of the preset candidate category and the confidence of the category to which the target object belongs are presented in each candidate region, and the target detection model is obtained by training a neural network based on a training sample and a marking parameter used to mark the candidate region.

Based on the first aspect, in a possible implementation, the plurality of candidate regions in the image are pre-determined based on a constraint condition. The constraint condition includes: a region range in which an object corresponding to each preset candidate category is presented in the image and an imaging size range of the object corresponding to each preset candidate category in the image.

Marked location regions are screened by using the constraint condition, so that some location regions that do not need to be detected may be filtered out. In this way, a quantity of to-be-detected location regions in the image is reduced, and a detection speed and detection accuracy of the target detection model are improved.

In a possible implementation, the determining a plurality of candidate regions in the image includes: marking initial candidate regions in the image; and screening the initial candidate regions by using the constraint condition, and obtaining the plurality of candidate regions based on a screening result.

In a possible implementation, the method further includes an optimization step for the target detection model, and the optimization step includes: obtaining a training sample set, where the training sample set includes a plurality of sample images, and a target object is presented in each sample image; inputting the sample image to the target detection model, to obtain a category to which the target object in each sample image belongs and a first location region of the target object in the sample image, and determining a second location region in each sample image based on the category to which the target object in the sample image belongs, boundary coordinates of the first location region, and a parameter of a photographing device used to shoot the sample image; and determining a deviation between the first location region and the second location region in each training sample by using a preset loss function, and iteratively adjusting the target detection model based on the deviation to obtain an optimized target detection model.

Through optimization of the target detection model, detection accuracy of the target detection model can be further improved; in other words, accuracy of road target detection can be improved, and guarantees are provided for obstacle detection, avoidance, and the like of a subsequent autonomous driving vehicle.

According to a second aspect, an embodiment of this application provides a target detection apparatus, and the target detection apparatus includes: an obtaining module, configured to obtain an image by using a photographing apparatus; a marking module, configured to mark a region of interest in the image based on a parameter of the photographing apparatus and a preset traveling path; a first detection module, configured to detect the image by using a target detection algorithm, to obtain a category to which a target object in the image belongs, a first location region of the target object in the image, and a confidence of the category to which the target object belongs; and a first modification module, configured to modify, based on a relative location relationship between the first location region and the region of interest, the confidence of the category to which the target object belongs, to obtain a first confidence.

Based on the second aspect, in a possible implementation, the target detection apparatus further includes: a determining module, configured to: determine, in response to the fact that the first confidence is greater than a preset threshold, a second location region in the image based on the parameter of the photographing apparatus, boundary coordinates of the first location region in the image, and a preset size of the object corresponding to the category in the real world; a second detection module, configured to detect an error between the first location region and the second location region; and a second modification module, configured to modify the first confidence based on the error, to obtain a second confidence of the category to which the target belongs.

Based on the second aspect, in a possible implementation, the parameter of the photographing apparatus includes at least one of the following: a focal length of the photographing apparatus, a distance between the photographing apparatus and a reference plane, a transformation matrix for transforming a coordinate system of the photographing apparatus into an image coordinate system, and a size of a photosensitive unit in a photosensitive element.

Based on the second aspect, in a possible implementation, the determining module includes: a first determining sub-module, configured to determine a distance between the photographing apparatus and the target object based on the focal length of the photographing apparatus, the distance between the photographing apparatus and the reference plane, the transformation matrix for transforming the coordinate system of the photographing apparatus into the image coordinate system, the size of the photosensitive unit in the photosensitive element, and the boundary coordinates of the first location region in the image; and a second determining sub-module, configured to determine the second location region in the image based on the distance between the photographing apparatus and the target object, the size of the object corresponding to the detected category in the real world, the distance between the photographing apparatus and the reference plane, and the boundary coordinates of the first location region.

Based on the second aspect, in a possible implementation, the category to which the target object belongs is selected from preset candidate categories based on a matching result obtained after matching a feature of the target object with features of a plurality of objects corresponding to the preset candidate categories.

Based on the second aspect, in a possible implementation, the first detection module includes: a setting sub-module, configured to set a marking parameter in a pre-trained target detection model, where the marking parameter is used to indicate that the target detection model marks a plurality of candidate regions in the image; and a detection sub-module, configured to input the image to the target detection model to obtain an output result of the target detection model, where the output result is used to indicate whether an object of the preset candidate category and the confidence of the category to which the target object belongs are presented in each candidate region, and the target detection model is obtained by training a neural network based on a training sample and a marking parameter used to mark the candidate region.

Based on the second aspect, in a possible implementation, the plurality of candidate regions in the image are predetermined based on a constraint condition. The constraint condition includes: a region range in which an object corresponding to each preset candidate category is presented in the image and an imaging size range of the object corresponding to each preset candidate category in the image.

Based on the second aspect, in a possible implementation, the setting sub-module is specifically configured to: mark initial candidate regions in the image; and screen the initial candidate regions by using the constraint condition, and obtain the plurality of candidate regions based on a screening result.

Based on the second aspect, in a possible implementation, the target detection apparatus further includes a model optimization module, and the model optimization module is specifically configured to: obtain a training sample set, where the training sample set includes a plurality of sample images, and a target object is presented in each sample image; input the sample image to the target detection model, to obtain a category to which the target object in each sample image belongs and a first location region of the target object in the sample image, and determine a second location region in each sample image based on the category to which the target object in the sample image belongs, boundary coordinates of the first location region, and a parameter of a photographing device used to shoot the sample image; and determine a deviation between the first location region and the second location region in each training sample by using a preset loss function, and iteratively adjust the target detection model based on the deviation to obtain an optimized target detection model.

According to a third aspect, an embodiment of this application provides an electronic device. The electronic device includes a memory, a processor, and a computer program that is stored in the memory and that can run on the processor. When the processor executes the computer program, the electronic device is enabled to implement the method according to the first aspect.

According to a fourth aspect, an embodiment of this application provides a computer-readable storage medium. The computer-readable storage medium stores instructions, and when the instructions are run on a computer, the computer is configured to perform the method according to the first aspect.

According to a fifth aspect, an embodiment of this application provides a computer program or a computer program product. When the computer program or the computer program product is executed on a computer, the computer is enabled to perform the method according to the first aspect.

It should be understood that the second aspect to the fifth aspect of this application are consistent with technical solutions of the first aspect of this application, and beneficial effects obtained in the aspects and corresponding feasible implementations are similar, and are not described again.

DESCRIPTION OF EMBODIMENTS

The following describes embodiments of this application with reference to the accompanying drawings in embodiments of this application. In the following descriptions, refer to specific aspects of embodiments of this application that form a part of this application and that are shown through description, or accompanying drawings of the specific aspects of embodiments of this application. It should be understood that embodiments of this application may be used in other aspects, and may include structural or logical changes not depicted in the accompanying drawings. Therefore, the following detailed descriptions should not be understood in the sense of limitation, and the scope of this application is defined by the appended claims. For example, it should be understood that the disclosure with reference to the described method may also be applied to a corresponding device or system for performing the method, and vice versa. For example, if one or more specific method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include one step for implementing functionality of one or more units (for example, one step for implementing functionality of one or more units; or a plurality of steps, each of which is for implementing functionality of one or more units in a plurality of units), even if such one or more of steps are not explicitly described or illustrated in the accompanying drawings. Further, it is understood that the features of the various example embodiments and/or aspects described herein may be combined with each other, unless specifically noted otherwise.

A target detection method described in this application may be applied to various scenarios in which a small target in an image needs to be detected and identified in an image recognition field. Detection of a small target on a road in an autonomous driving scenario is used as an example below to describe this application in detail.

Figure 1:
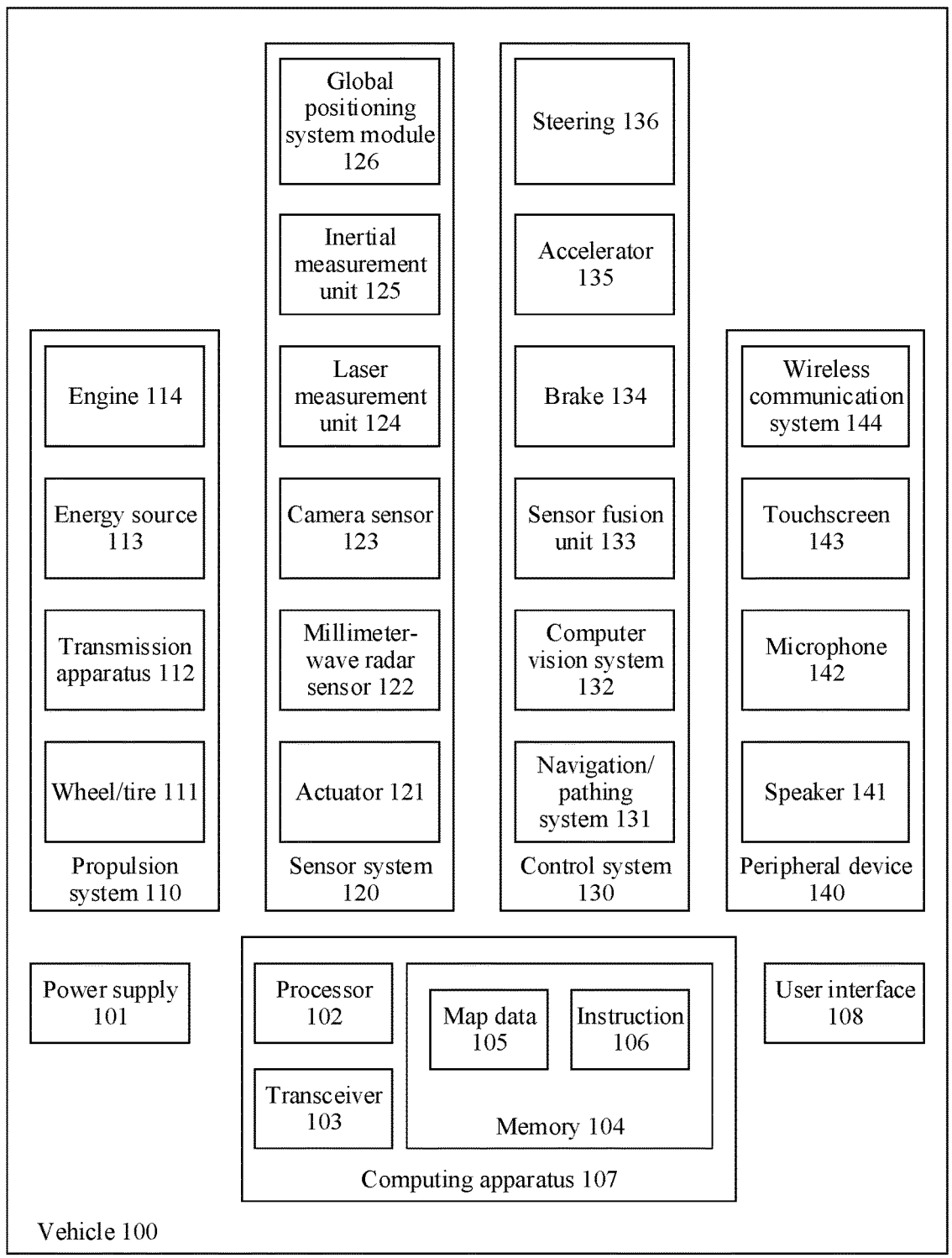
FIG. 1 is a schematic diagram of a hardware structure of an application scenario applied to an embodiment of this application according to an embodiment of this application.

FIG. 1 is a schematic diagram of a structure of a vehicle according to an embodiment of this application.

Components coupled to a vehicle 100 or included in a vehicle 100 may include a propulsion system 110, a sensor system 120, a control system 130, a peripheral device 140, a power supply 101, a computing apparatus 107, and a user interface 108. The computing apparatus 107 includes a processor 102, a transceiver 103, and a memory 104. The computing apparatus 107 may be a controller of the vehicle 100 or a part of the controller. The memory 104 includes instructions 106 that can be run by the processor 102, and may further store map data 105. The components of the vehicle 100 may be configured to work in a manner in which the components are interconnected with each other and/or interconnected with other components coupled to each system. For example, the power supply 101 may provide electric power to all the components of the vehicle 100. The computing apparatus 107 may be configured to receive data from the propulsion system 110, the sensor system 120, the control system 130, and the peripheral device 140, and control the propulsion system 110, the sensor system 120, the control system 130, and the peripheral device 140. The computing apparatus 107 may be configured to display an image generated on the user interface 108 and receive input from the user interface 108.

In some possible implementations, the vehicle 100 may further include more, fewer, or different systems, and each system may include more, fewer, or different components. In addition, the shown system and components may be combined or divided in any manner. This is not specifically limited in this embodiment of this application.

The foregoing systems are described below.

The propulsion system 110 may be configured to provide dynamic movement for the vehicle 100. Still as shown in FIG. 1, the propulsion system 110 may include an engine 114, an energy source 113, a transmission (transmission) apparatus 112, and a wheel/tire 111. Certainly, the propulsion system 110 may additionally or alternatively include another component in addition to the components shown in FIG. 1. This is not specifically limited in this embodiment of this application.

The sensor system 120 may include several sensors configured to sense information about an environment in which the vehicle 100 is located. As shown in the figure, the sensors in the sensor system include at least one of a global positioning system (GPS) 126, an inertial measurement unit (inertial measurement unit, IMU) 125, a laser radar sensor 124, a visual sensor 123, a millimeter-wave radar sensor 122, and an actuator 121 configured to modify a position and/or an orientation of the sensor. The sensor system 120 may further include an additional sensor, including, for example, a sensor that monitors an internal system of the vehicle 100 (for example, at least one of an O2 monitor, a fuel gauge, engine oil temperature, and the like). The sensor system 120 may alternatively include another sensor.

The global positioning system (global positioning system, GPS) module 126 may be any sensor configured to estimate a geographic location of the vehicle 100. Therefore, the GPS module 126 may include a transceiver that estimates a position of the vehicle 100 relative to the earth based on satellite positioning data. For example, the computing apparatus 107 may be configured to estimate, in combination with the map data 105 by using the GPS module 126, a location of a lane boundary on a road on which the vehicle 100 may travel. The GPS module 126 may alternatively be in another form.

The IMU 125 may be configured to sense a position change and a direction change of the vehicle 100 based on an inertial acceleration and any combination thereof. In some examples, a combination of sensors may include, for example, an accelerometer and a gyroscope. There may also be another combination of sensors.

The laser radar sensor (light detection and ranging, LiDAR) 124 may be considered as an object detection system, and the sensor senses or detects, by using light, an object in an environment in which the vehicle 100 is located. Generally, the LiDAR 124 is an optical remote sensing technology in which a distance to a target or another attribute of the target may be measured by irradiating the target with light. For example, the LiDAR 124 may include a laser source and/or a laser scanner configured to transmit a laser pulse and a detector configured to receive reflection of the laser pulse. For example, the LiDAR 124 may include a laser rangefinder reflected by a rotation mirror and scans a laser around a digital scene in one or two dimensions, to collect a distance measurement value at specified angular intervals. For example, the LiDAR 124 may include a light source (such as a laser), a scanner, an optical system, components such as a photodetector, a receiver, and an electronic component, and a position and navigation system. The LiDAR 124 determines a distance to an object by scanning a laser reflected from the object, to form a three-dimensional (3 dimensions, 3D) environment diagram with precision of up to a centimeter level.

The visual sensor (visual sensor) 123 may be configured to obtain any camera (such as a static camera or a video camera) of an image of the environment in which the vehicle 100 is located. Therefore, the visual sensor 123 may be configured to detect visible light, or may be configured to detect light from another part (such as infrared light or ultraviolet light) of a spectrum. There may also be another type of visual sensor. The visual sensor 123 may be a two-dimensional detector, or may be a detector with a three-dimensional spatial range. In some possible implementations, the visual sensor 123 may be, for example, a distance detector configured to generate a two-dimensional image indicating distances from the visual sensor 123 to several points in the environment. Therefore, the visual sensor 123 may use one or more distance detection technologies. For example, the visual sensor 123 may be configured to use a structured light technology, and the vehicle 100 irradiates an object in the environment by using a predetermined light pattern, such as a grid pattern or a checkerboard grid pattern, and detects reflection of a predetermined light pattern from the object by using the visual sensor 123. Based on distortion in a reflected light pattern, the vehicle 100 may be configured to detect a distance to a point on the object. The predetermined light pattern may include infrared light or light of another wavelength.

The millimeter-wave radar sensor (millimeter-wave radar) 122 is generally an object detection sensor with a wavelength of 1 mm to 10 mm, and a frequency range is approximately 10 GHz to 200 GHz. A measurement value of the millimeter-wave radar has depth information, and can provide a distance to the target. Second, because the millimeter-wave radar has an obvious Doppler effect and is very sensitive to a speed, a speed of the target can be directly obtained, and the speed of the target can be extracted by detecting Doppler shift of the target. Currently, two mainstream application bands of a vehicle-mounted millimeter-wave radar are separately 24 GHz and 77 GHz. The former has a wavelength of approximately 1.25 cm, and is mainly used for short-distance sensing, such as a vehicle ambient environment, a blind spot, parking assistance, and lane changing assistance. The latter has a wavelength of approximately 4 mm, and is used for medium-long distance measurement, such as automatic car following, adaptive cruise control (adaptive cruise control, ACC), and autonomous emergency braking (autonomous emergency braking, AEB).

The control system 130 may be configured to control operations of the vehicle 100 and the components of the vehicle 100. Therefore, the control system 130 may include a steering unit 136, an accelerator 135, a brake unit 134, a sensor fusion unit 133, a computer vision system 132, and a navigation or pathing (pathing) system 131. Certainly, the control system 130 may additionally or alternatively include another component in addition to the components shown in FIG. 1. This is not specifically limited in this embodiment of this application.

The peripheral device 140 may be configured to allow the vehicle 100 to interact with an external sensor, another vehicle, and/or a user. Therefore, the peripheral device 140 may include, for example, a wireless communication system 144, a touchscreen 143, a microphone 142, and/or a speaker 141. Certainly, the peripheral device 140 may additionally or alternatively include another component in addition to the components shown in FIG. 1. This is not specifically limited in this embodiment of this application.

The power supply 101 may be configured to provide electric power to some or all components of the vehicle 100. Therefore, the power supply 101 may include, for example, a rechargeable lithium-ion or lead-acid battery. In some examples, one or more battery packs may be configured to provide electric power. There may also be another power supply material and configuration. In some possible implementations, the power supply 110 and the energy source 113 may be implemented together.

The processor 102 included in the computing apparatus 107 may include one or more general-purpose processors and/or one or more dedicated processors (such as an image processor and a digital signal processor). Compared with a case in which the processor 102 includes more than one processor, the processor may work independently or in combination in this case. The computing apparatus 107 may implement a function of controlling the vehicle 100 based on input received through the user interface 108.

The transceiver 103 is used for communication between the computing apparatus 107 and each system.

The memory 104 may further include one or more volatile storage components and/or one or more non-volatile storage components, such as an optical, magnetic, and/or organic storage apparatus, and the memory 104 may be entirely or partially integrated with the processor 102. The memory 104 may include instructions 106 (such as program logic) that may be run by the processor 102, to run various vehicle functions, including any one of functions or methods described in embodiments of this application.

The components of the vehicle 100 may be configured to work in a manner in which the components are interconnected with another component within and/or outside respective systems of the components. Therefore, the components and the systems of the vehicle 100 may be connected together by using a system bus, a network, and/or another connection mechanism.

In this embodiment of this application, with reference to the foregoing structure of the vehicle 100, in a process in which the vehicle is in an autonomous driving mode, a target detection algorithm is generally used to detect a target on a road in real time, to ensure traveling safety of the vehicle. For example, through target detection, the vehicle may be notified of a drivable region and a position of an obstacle is marked, to assist the vehicle in avoiding the obstacle.

When target detection is performed by using the target detection algorithm, first, the computing apparatus trains, through deep learning, a neural network that can identify a specific category of object. Herein, the specific category of object may be a common target object such as a pedestrian, a vehicle, a tree, a house, or road facility. During target detection, the computing apparatus may identify the specific category of object by using the neural network. Because the neural network learns features of specific categories of objects, when some similar features appear in an image, effective identification cannot be performed, and misjudging is easily generated.

Figure 2:
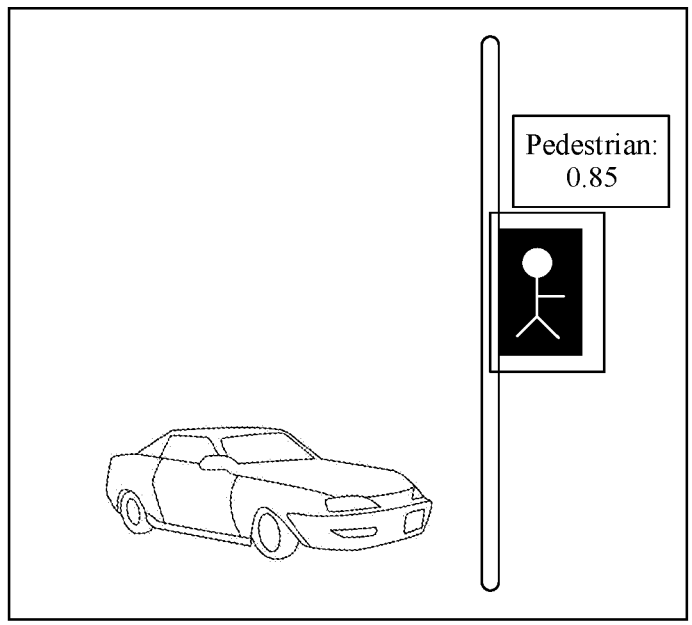
FIG. 2 is a schematic diagram of misjudging an object presented in an image in a conventional technology according to an embodiment of this application.

For example, as shown in FIG. 2, a pedestrian identifier is presented on a direction board, and the pedestrian is not an actual pedestrian object. However, a feature of the pedestrian identifier presented on the direction board is generally similar to a feature of a distant pedestrian on a road. Consequently, the neural network misjudges the pedestrian identifier presented on the direction board as a small target on the road: a pedestrian. For example, as shown in FIG. 2, a probability that the neural network determines that a pedestrian identifier on a direction board shown in FIG. 2 is a pedestrian is 0.85, and therefore, accuracy of target detection is reduced.

To resolve the foregoing problem, an embodiment of this application provides a target detection method, and the method may be applied to a target detection apparatus. The target detection apparatus may be the computing apparatus in the foregoing embodiment or a part of the computing apparatus.

Figure 3:
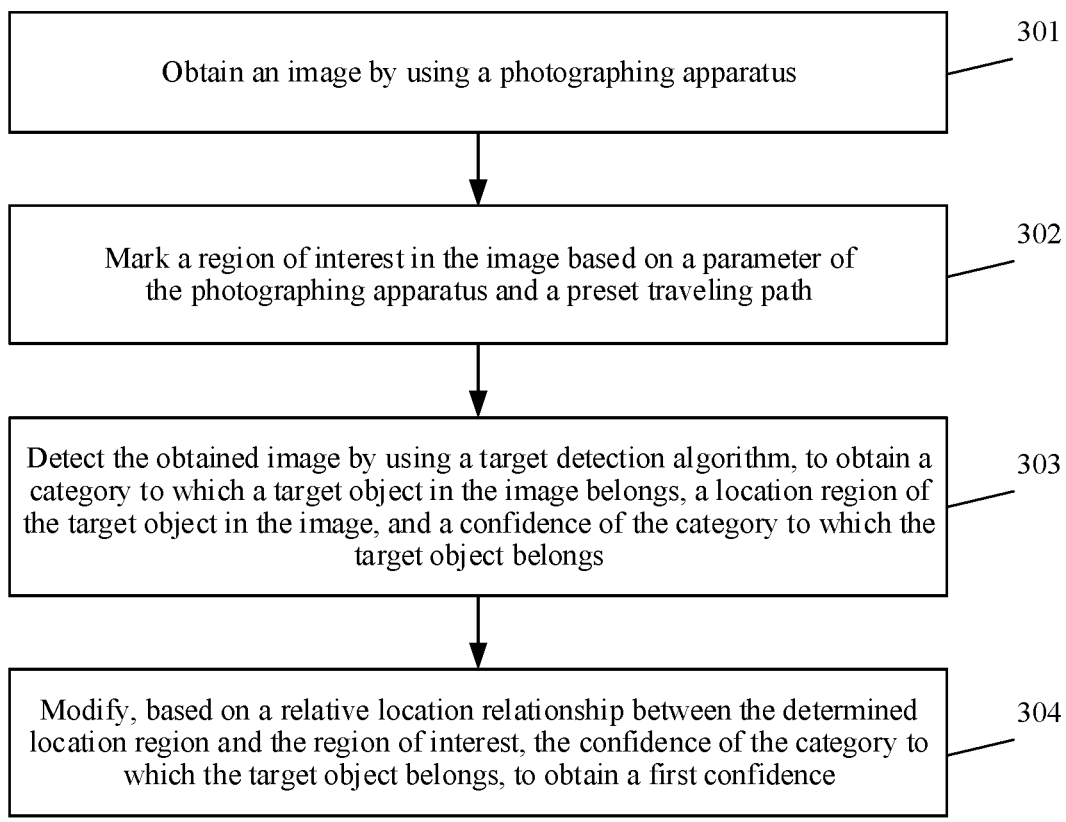
FIG. 3 is a schematic flowchart of a target detection method according to an embodiment of this application.

FIG. 3 is a schematic flowchart of a target detection method according to an embodiment of this application. As shown in FIG. 3, the method includes the following steps.

S301: Obtain an image by using a photographing apparatus.

The photographing apparatus herein is a visual sensor in the foregoing sensor system, and is configured to collect an image of a road ahead of a vehicle body. The image may include objects such as a pedestrian, a vehicle, a road surface, and an isolation fence, and certainly, may further include a sidewalk, sidewalk planting, a traffic light, and the like. This is not specifically limited in this embodiment of this application.

In actual application, the photographing apparatus may be a monocular camera, and the monocular camera shoots one to-be-processed image at one moment. Alternatively, the photographing apparatus may further include a multi-camera. These cameras may be physically disposed in one photographing apparatus, or may be physically disposed in a plurality of photographing apparatuses separately. A plurality of images are shot at a same moment by using the multi-camera, and processing may be processed based on these images, to obtain a to-be-identified image. Certainly, the photographing apparatus may alternatively be in another case. This is not specifically limited in this embodiment of this application.

In specific implementation, the photographing apparatus may collect an image in real time, or may periodically collect an image. A period is 3 s, 5 s, 10 s, or the like. The photographing apparatus may alternatively collect an image in another manner. This is not specifically limited in this embodiment of this application. After collecting the image, the photographing apparatus may transfer the image to the foregoing target detection apparatus. In this case, the target detection apparatus may obtain the image. It should be noted herein that S301 may be performed after a vehicle is started or after a vehicle starts an autonomous driving function.

Step S302: Mark a region of interest (region of interest, ROI) in the image based on a parameter of the photographing apparatus and a preset traveling path.

The image obtained by the photographing apparatus is usually a road condition image. Objects in front of and on both sides of a road are usually presented in the image, for example, a vehicle or a pedestrian in front of the road or on a side of the road, trees on both sides of the road, or a tire or a wooden box within a lane. Therefore, the region of interest in the image may be a road ahead and roads on both sides. In the image, the ROI may be a region drawn in a manner such as a box, a circle, an oval, an irregular polygon, or the like. FIG. 5b schematically shows the ROI in the image.

In a specific implementation process, the ROI may be determined by using the parameter of the photographing apparatus and the preset traveling path. The parameter of the photographing apparatus includes, for example, but is not limited to a height of the photographing apparatus relative to a reference plane and a location at which the photographing apparatus is mounted in the vehicle. The preset traveling path includes, for example, but is not limited to a lane in which the vehicle is located and a traveling rule of the vehicle (for example, keep to the left or keep to the right). After obtaining the image, the target detection apparatus may mark the region of interest in the image based on the parameter of the photographing apparatus and the preset traveling path.

Step S303: Detect the obtained image by using a target detection algorithm, to obtain a category to which a target object in the image belongs, a location region of the target object in the image, and a confidence of the category to which the target object belongs.

Step S303 may be specifically implemented by using the following steps.

Step 1: Set a marking parameter in a target detection model, where the marking parameter is used to indicate that the target detection model marks a plurality of candidate regions in the image.

Herein, the marking parameter is a location parameter (such as location coordinates in the image) of each of the plurality of candidate regions in the image. A location of the candidate region in the image is predetermined. Determining the candidate region herein may also be referred to as setting a priors anchor (priors anchor).

In practice, the plurality of candidate regions may be determined by using various existing methods such as manual setting, K-means clustering, an RPN (region proposal network) algorithm, or a selective search (selective search) algorithm. Then, a location parameter of each determined candidate region in the image is set in the target detection model. A method for determining the candidate region may be implemented in the following two manners.

In a possible implementation, the image is equally divided into a plurality of units for a size of the image. Then, for each equally divided unit in the image, a plurality of priors anchors with different length-width ratios are set, and differences of the length-width ratios of the plurality of priors anchors may be an arithmetic progression. The set plurality of priors anchors are the plurality of candidate regions.

In another possible implementation, the image is segmented by using a segmentation method, to obtain a candidate region image set of a plurality of image blocks obtained after the image is segmented. Similarity of every two adjacent regions in the candidate region image set is calculated (for example, may be determined from a plurality of dimensions such as color similarity and texture similarity), and finally, regions whose similarity is greater than a preset threshold are combined to determine a final candidate region.

Step 2: Input the image to a pre-trained target detection model for which a marking parameter has been set, so that the target detection model detects a confidence of presenting a target object of a preset candidate category in each candidate region and a positioning deviation of the candidate region. When it is detected that a confidence of presenting a specific category or several categories of targets in preset candidate categories in one or several candidate regions is relatively high, and the confidence exceeds a threshold, it is predicted that the object of the preset candidate category is presented in the one or several regions. The positioning deviation of the candidate region is determined by the target detection model by performing edge detection on the candidate region and performing fully connected layer (or fully convolutional layer) detection on the plurality of candidate regions. The target detection model may adjust a location of the candidate region in the image by using the positioning deviation of the candidate region. Then, the target detection model outputs location information, in the image, of the candidate region in which the target object is presented, a category to which the target object presented in the candidate region belongs, and a confidence of the category to which the target object belongs. The preset candidate category may be an obstacle on a road, including but not limited to a pedestrian, a vehicle, a tree, a tire, a box, a construction board, and the like. The location information, in the image, that is output by the target detection model and that is of the candidate region in which the target object is presented is location information obtained after the location in the image is re-adjusted based on the positioning deviation of the candidate region.

In a possible implementation, the candidate region in step 1 may alternatively be determined based on a constraint condition.

In specific implementation, initial candidate regions may be marked in the image by using the foregoing methods such as a selective search algorithm, manual setting, RPN, or K-means clustering. Then, the initial candidate regions are screened by using the constraint condition, to obtain a final candidate region.

The constraint condition is specifically: a region range in which each object of the preset candidate category is presented in the image and an imaging size range of each object of the preset candidate category in the image.

The region range in which each object of the preset candidate category is presented in the image is determined based on a location region in which each object may appear in the real world. In practice, the location region in which each object may appear in the real world may be mapped to the image based on a focal length of the photographing apparatus, a size of a photosensitive unit in a photosensitive element, a photocenter parameter of the photographing apparatus, location coordinates of a road surface in a world coordinate system, and the height of the photographing apparatus relative to the reference plane. A mapping region in the image is the region range in which the target is presented in the image.

The imaging size range of each object of the preset candidate category in the image is determined based on a distance between the target object and the photographing apparatus and a height and a width of each object in the real world. At different distances, imaging sizes of objects of a same category in an image photographed by a same photographing apparatus are different. In practice, sizes of each object presented in the image at different distances may be determined based on the focal length of the photographing apparatus, the size of the photosensitive unit in the photosensitive element, the photocenter parameter of the photographing apparatus, the location coordinates of the road surface in the world coordinate system, the height of the photographing apparatus relative to the reference plane, and the height and the width of each object in the real world, and then the imaging size range of each object in the image is determined.

For example, it is assumed that the candidate target category includes only a pedestrian, and the constraint condition includes: A location at which the pedestrian may appear is a road surface region, and an imaging size range of the pedestrian in the image is a to b, and a is less than b. When a distance between the pedestrian and the photographing apparatus is 50 meters, an imaging size in the image is a, and when the distance between the pedestrian and the photographing apparatus is 300 meters, an imaging size in the image is b. 50 meters to 300 meters may be considered as a distance range in which the photographing apparatus can perform photographing. The imaging size of the pedestrian in the image is determined based on a height and a width of the pedestrian in the real world, the distance between the pedestrian and the photographing apparatus, the focal length of the photographing apparatus, the size of the photosensitive unit in the photosensitive element, the photocenter parameter of the photographing apparatus, and the height of the photographing apparatus relative to the reference plane. A region range of the road surface presented in the image may be marked based on the focal length of the photographing apparatus, the photocenter parameter of the photographing apparatus, the location coordinates of the road surface in the world coordinate system, and the height of the photographing apparatus relative to the reference plane, and the region range is denoted as a road surface range. Then, a candidate region that is located within the road surface range and whose size is between a and b is selected from the initial candidate regions. Therefore, the selected region is used as the final candidate region.

The reference plane may be a horizontal plane.

Marked location regions are screened by using the constraint condition, so that some location regions that do not need to be detected may be filtered out. In this way, a quantity of to-be-detected location regions in the image is reduced, and a detection speed and detection accuracy of the target detection model are improved.

The target detection model described in step 2 is obtained by training a neural network based on a training sample set and a preset loss function.

Specifically, the training sample set includes a sample image and annotation information for the sample image. A target object in the sample image herein is a small target object on the road; in other words, a location of the target object in the image is relatively small (for example, is less than a preset area threshold).

Figure 4:
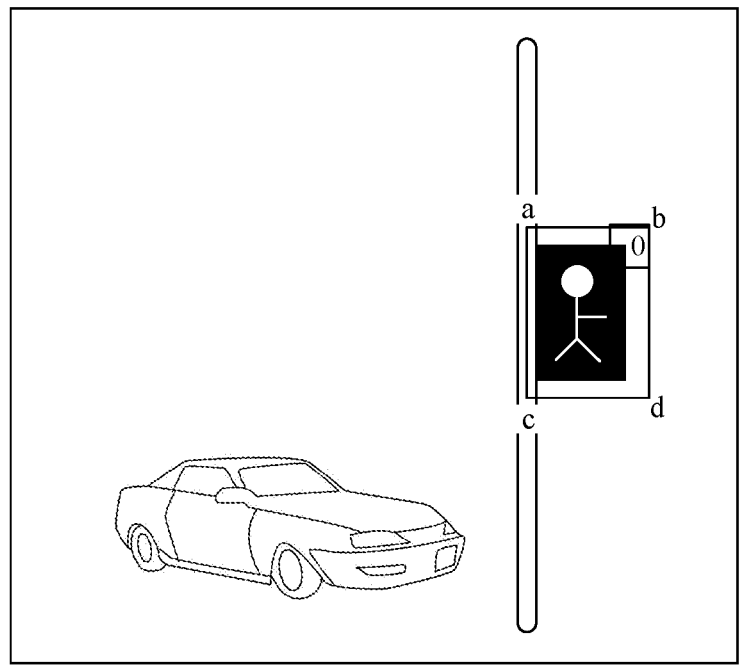
FIG. 4 is a schematic diagram of a negative sample provided in a training process of a target detection model according to an embodiment of this application.

The sample image includes a positive sample image and a negative sample image. The negative sample image includes an image in which a presented object has a shape or a contour of one preset candidate category but belongs to another category, and the another category may be another preset candidate category, or may not be any preset candidate category, such as an image in which there is a tree with a pedestrian contour at a partial location, an image in which there is a trash can with a dog contour, or an image in which there is a direction board on which a pedestrian is displayed, as shown in FIG. 4. The annotation information is used to indicate a category to which an object in the positive sample image belongs and a location of the object in the sample image. The annotation information is further used to indicate a category to which an object presented in the negative sample image belongs or a category that is not the preset candidate category, and a location, in the sample image, of the object presented in the image. For example, it is assumed that the preset candidate categories include two categories: a pedestrian and a tree. The pedestrian is represented by 1, the tree is represented by 2, and a category other than the pedestrian and the tree is represented by 0. Annotation information of a negative sample shown in FIG. 4 is 0 and a location region is (a, b, c, d), where a, b, c, and d are separately image coordinates, in FIG. 4, of four vertices of a rectangular frame shown in FIG. 4.

The candidate region is obtained based on the size of the sample image and the size of the to-be-detected target with reference to the constraint condition and a candidate region determining method, and then a location parameter of the candidate region in the image is set in the neural network.

The sample image is input to a neural network for which a parameter has already been set, to obtain random output information, and the random output information includes a category corresponding to an object presented in the sample image, a location region in the image, and a confidence of the category corresponding to the presented object.

Then, a deviation between the output information and the annotation information is calculated by using the preset loss function, and a weight parameter of the neural network is iteratively adjusted based on the deviation, to obtain the target detection model. The preset loss function herein may include but is not limited to a mean square error function or the like. The annotation information may include an annotated confidence, and the calculated deviation between the output information and the annotation information herein may be a deviation between the confidence of the category corresponding to the presented object and the annotated confidence.

It should be noted that the neural network may include a convolutional layer, a pooling layer, a hidden layer, a fully connected layer, and the like. A quantity of layers may be determined based on a quantity of to-be-identified categories, a quantity of target categories presented in each image, and a quantity of pixels of the image.

Step 304: Modify, based on a relative location relationship between the determined location region and the region of interest, the confidence of the category to which the target object belongs, to obtain a first confidence.

It is determined, based on boundary coordinates of the region of interest determined in step S303 and boundary coordinates of the location region determined in step S302, whether lower boundary coordinates of the location region are within an ROI range. When a lower boundary of a first location is not within the ROI range, the first confidence may be set to a relatively small confidence value such as 0 or 0.1. In other words, a probability that the target object belongs to the category is very low. When the lower boundary of the first location is within the ROI range, the first confidence may be set to a relatively large confidence value such as 0.8, 0.9, or 1.

For example, when the detected target object is a pedestrian, the pedestrian is usually in contact with the ground, regardless of a fact that the feet are in contact with the ground or the pedestrian is traveling on the ground by using transportation means such as a motorbike or a bicycle. In this case, the ROI in the image is the ground. Then, it is determined whether a lower boundary of a location region in which a human image is located is within a ground range, to determine whether a person presented in the image is in contact with the ground. When it is detected that the lower boundary of the location region in which the human image is located is within the ground range, it indicates that the person is in contact with the ground; in other words, a confidence of a case in which the target object is a person is relatively high, and the first confidence is set to a relatively large confidence value. When it is detected that the lower boundary of the location region in which the human image is located is not within the ground range, it indicates that the person is not in contact with the ground, and this is equivalent to that the person is floating in air, and in this case, the confidence of the case in which the target object is a person is relatively low, and the first confidence is set to a relatively small confidence value.

It may be learned from the embodiment shown in FIG. 3 that, the first confidence of the category to which the detected target object belongs is determined by using the location relationship between the location region in which the detected target object is located and the ROI, to further verify whether the category to which the detected target object belongs is correct, and filter out some category detection results that are illogical or that do not conform to common sense, so that accuracy of target detection is improved.

Implementation of the target detection method in FIG. 3 is specifically described with reference to an application scenario shown in FIG. 5a to FIG. 5e.

Figure 5A:
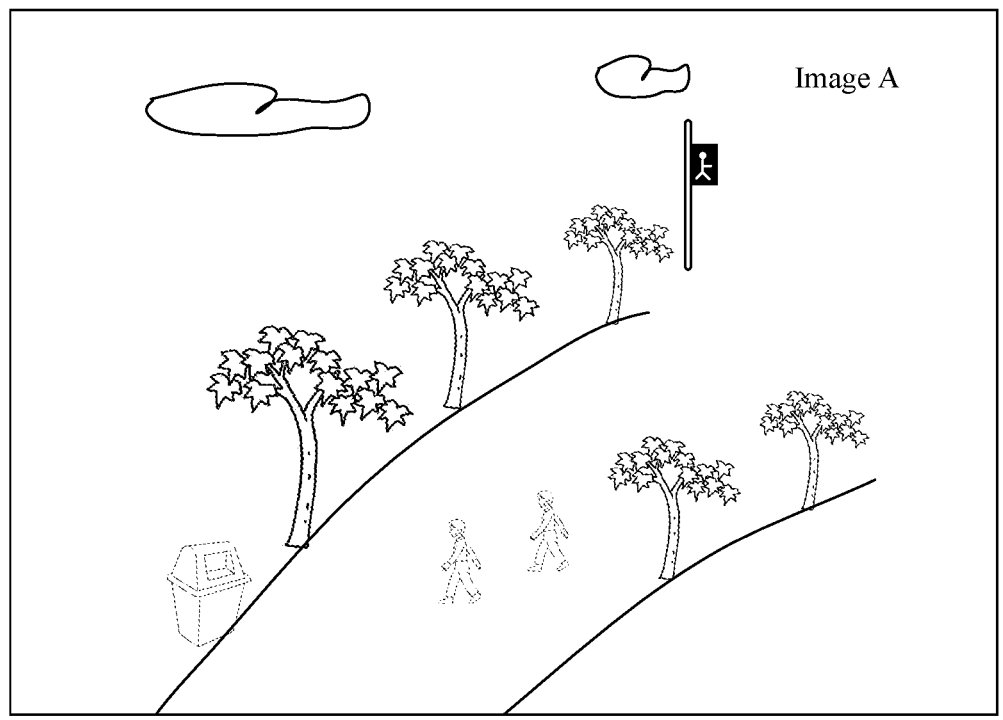
FIG. 5*a* to FIG. 5*e* are schematic diagrams of an application scenario of a target detection method according to an embodiment of this application.
Figure 5B:
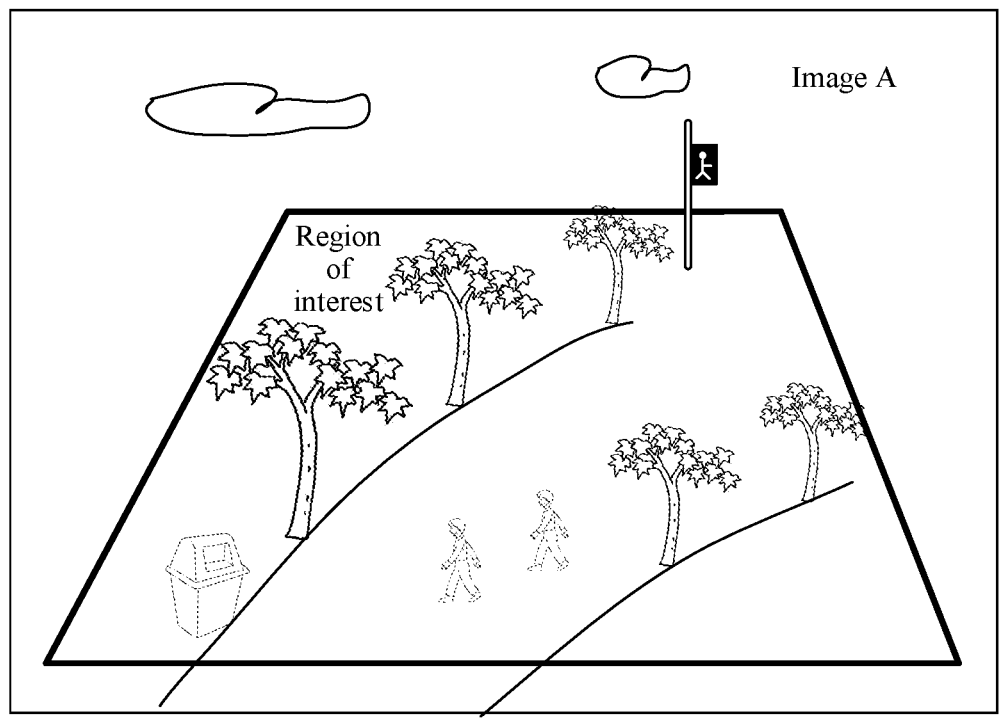

First, an image A shown in FIG. 5a is obtained by using the photographing apparatus.

Then, the target detection apparatus may determine a region of interest in the image A. The region of interest in the image A may be a region within a ground range, as shown in FIG. 5b. In this case, a target detection apparatus disposed in an autonomous driving vehicle may record boundary coordinates of the region of interest in the image A.

Figure 5C:
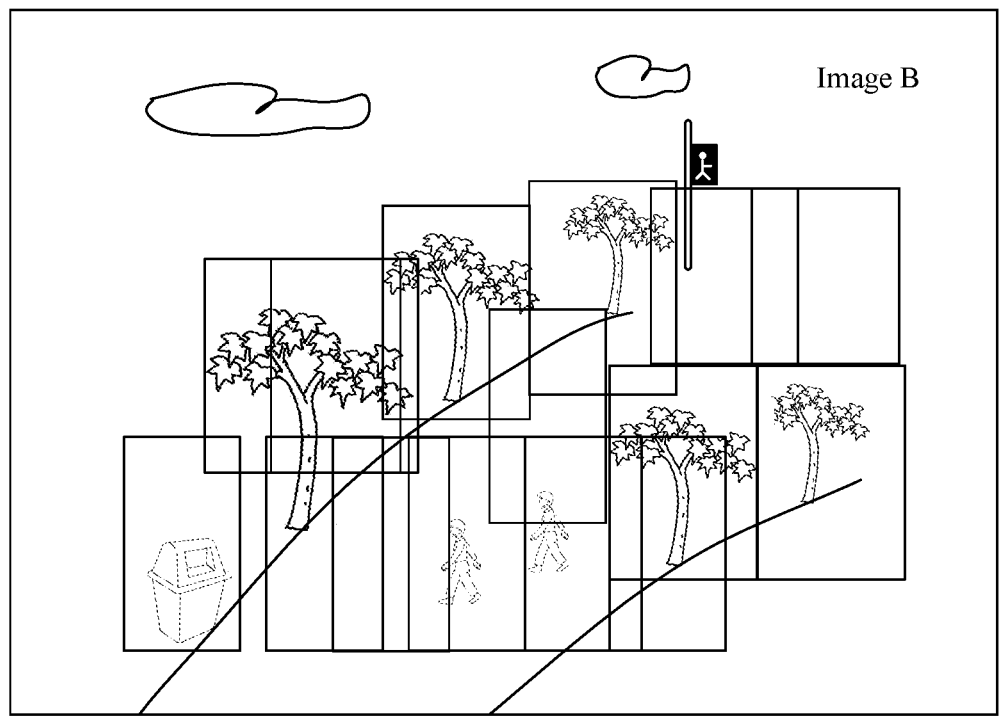

Then, a plurality of candidate region images are marked in the image by using the candidate region marking method described in step 1, to obtain an image B, as shown in FIG. 5c. It can be seen from FIG. 5c that a large quantity of rectangular frames are distributed in the image B, and each rectangular frame is a candidate region. It should be noted that the rectangular frame shown in FIG. 5c is an example. In actual application, more or fewer rectangular frames are included, and a size of each rectangular frame may also be determined based on a requirement of an application scenario.

Figure 5D:
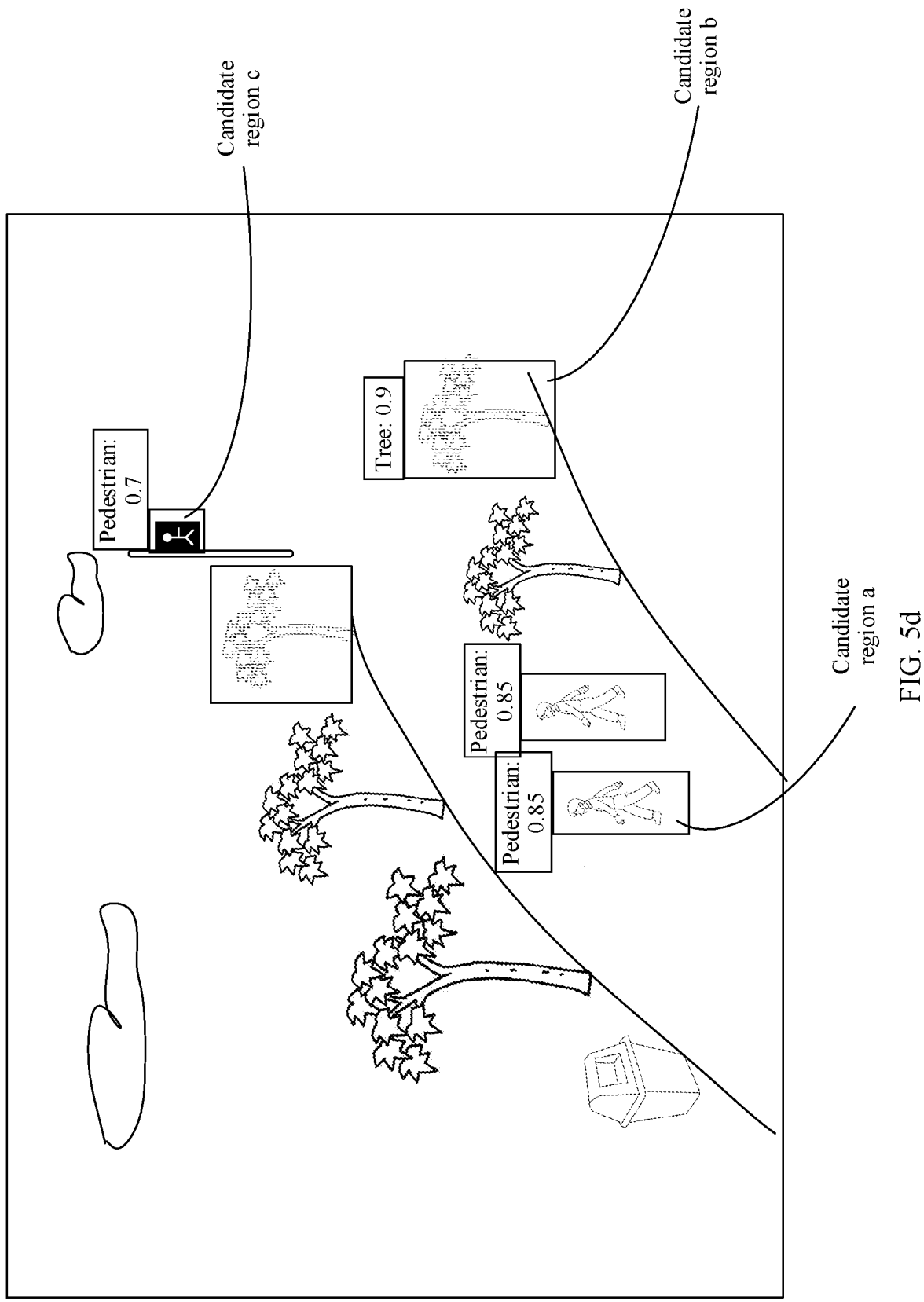

Then, the image B is input to a pre-trained target detection model, to determine whether a target object of a preset candidate category is presented in each candidate region, as shown in FIG. 5d. FIG. 5d shows a detection result output by the target detection model. It can be seen from FIG. 5d that the target detection model detects that a target object presented in a candidate region a is a pedestrian, and a probability is 0.85; a target object presented in a candidate region b is a tree, and a probability is 0.9; and a target object presented in a candidate region c is a pedestrian, and a probability is 0.7. The candidate region a, the candidate region b, and the candidate region c are location regions detected by the target detection model.

Figure 5E:
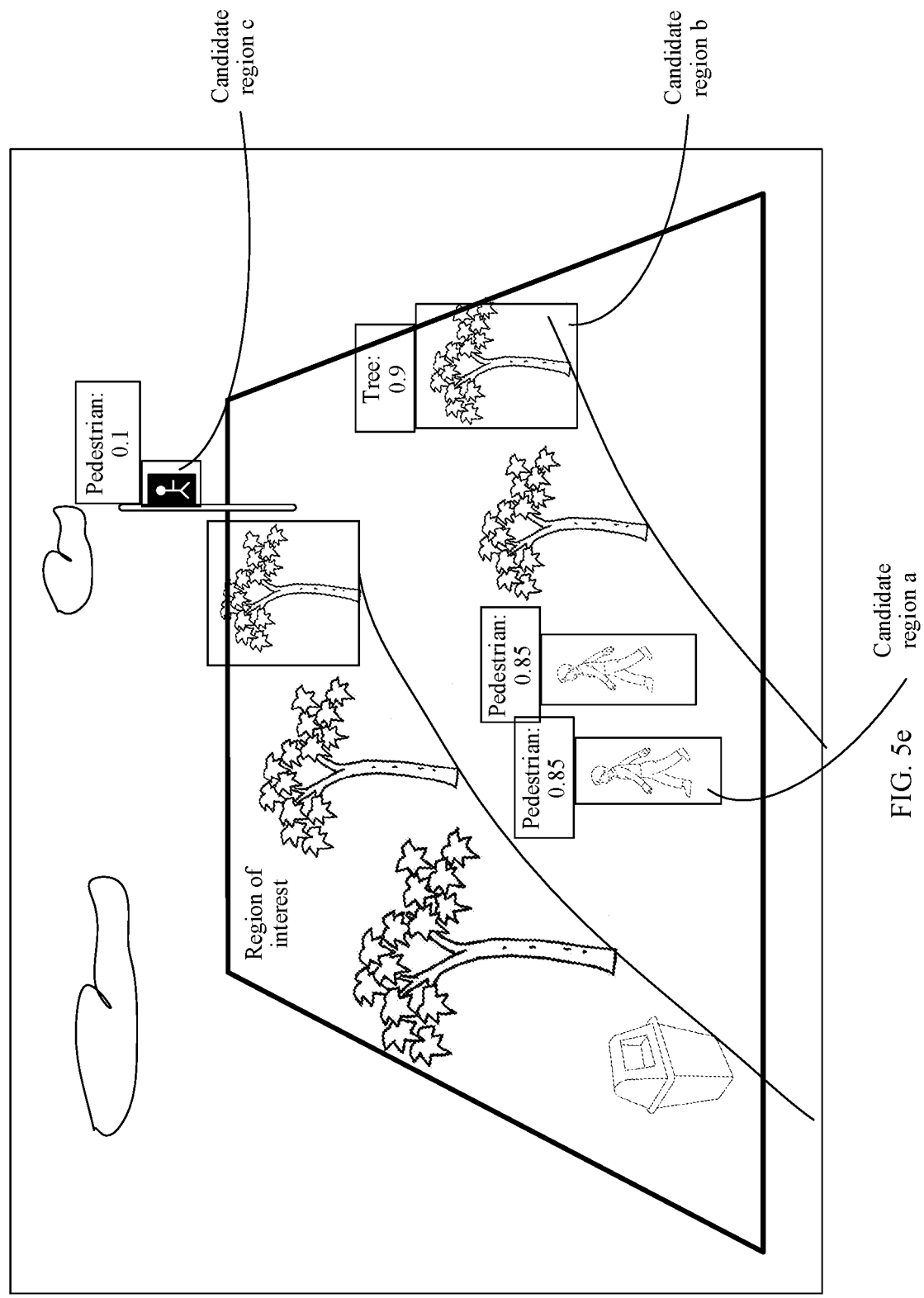

Finally, the target detection apparatus may compare image coordinates of each candidate region image with the boundary coordinates of the region of interest to determine whether the image coordinates of each candidate region image are within a range of the region of interest. As shown in FIG. 5e, the candidate region c is not within the range of the region of interest in the image. Feet of a pedestrian on the road should be in contact with the ground, but feet of the pedestrian in the candidate region c are not in contact with the ground. Therefore, the target detection apparatus may determine that a confidence of a case in which the object presented in the candidate region image c is a pedestrian is 0.1.

Figure 6A:
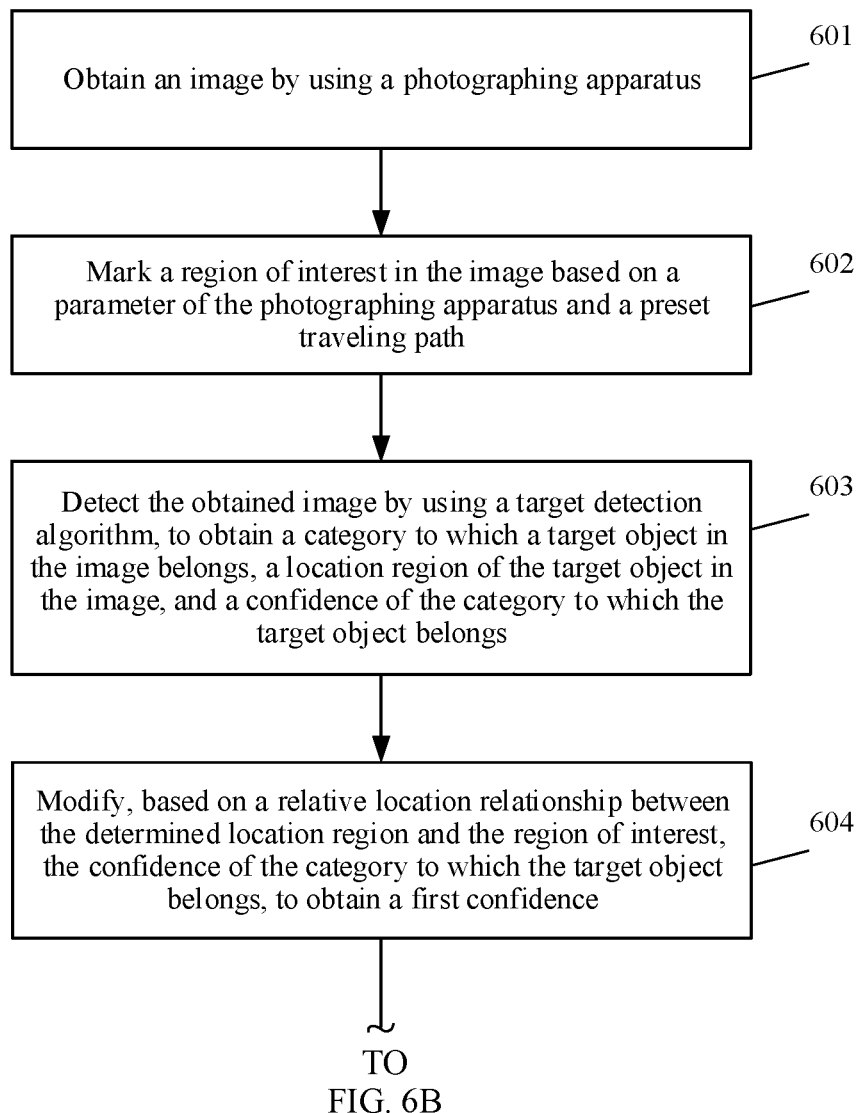
FIG. 6A and FIG. 6B are a schematic flowchart of another target detection method according to an embodiment of this application.
Figure 6B:
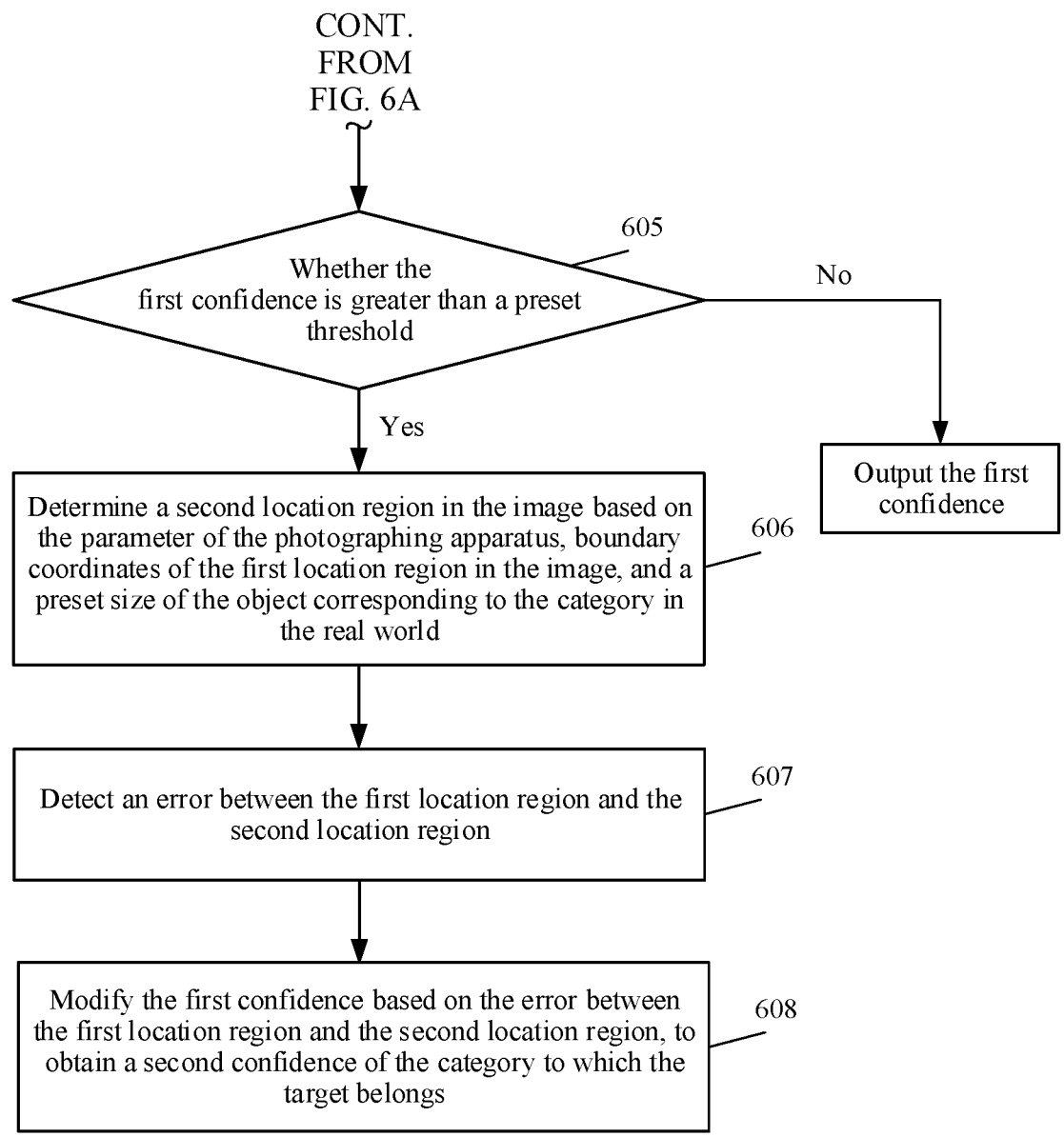

FIG. 6A and FIG. 6B are a flowchart of another embodiment of a target detection method according to this application. The target detection method includes the following steps.

S601: Obtain an image by using a photographing apparatus.

S602: Mark a region of interest in the image based on a parameter of the photographing apparatus and a preset traveling path.

S603: Detect the obtained image by using a target detection algorithm, to obtain a category to which a target object in the image belongs, a location region of the target object in the image, and a confidence of the category to which the target object belongs.

S604: Modify, based on a relative location relationship between the determined location region and the region of interest, the confidence of the category to which the target object belongs, to obtain a first confidence.

For specific implementation of step S601 to step S604 and beneficial effects brought by step S601 to step S604, refer to related descriptions of step S301 to step S304 in the embodiment shown in FIG. 3. Details are not described herein again.

S605: Detect whether the first confidence of the category to which the target object determined in step S604 belongs is greater than a preset threshold. When the first confidence is greater than the preset threshold, step S606 to step S608 are performed. When the first confidence is less than or equal to the preset threshold, a value of the first confidence is output.

S606: Determine a second location region in the image based on the parameter of the photographing apparatus, boundary coordinates of the first location region in the image, and a preset size of the object corresponding to the category in the real world.

The parameter of the photographing apparatus herein specifically includes but is not limited to a focal length of the photographing apparatus, a size of a photosensitive unit in a photosensitive element, a transformation matrix of the photographing apparatus, a distance between the photographing apparatus and a reference plane, and a photocenter parameter of the photographing apparatus.

The reference plane herein may be the ground.

Step S606 may be specifically implemented by using the following steps.

Step 1: Determine a distance between the photographing apparatus and the target object based on the focal length of the photographing apparatus, the distance between the photographing apparatus and the reference plane, the transformation matrix for transforming a coordinate system of the photographing apparatus into an image coordinate system, the size of the photosensitive unit in the photosensitive element, and the boundary coordinates of the first location region in the image.

Specifically, it is assumed that the category to which the target object detected in step S604 belongs is correct, and a size of the object corresponding to the category in the real world is queried. For example, a height of a pedestrian on the road is usually between 130 cm and 190 cm and a transverse width is usually between 43 cm and 55 cm. The distance between the photographing apparatus and the target object may be determined by using formula (1), that is, a formula for transforming the world coordinate system into an image plane coordinate system.

$$Z_w p = KR[I|T]P_w \qquad (1)$$

$P_w = [X_w \ Y_w \ Z_w \ 1]^T$ is coordinates of the target in the world coordinate system, $p = [u \ v \ 1]^T$ is imaging coordinates of the target in the image, K is a transformation matrix of the photographing apparatus, R is a rotation matrix from the world coordinate system to a coordinate system of the photographing apparatus, T is a translation matrix from the world coordinate system to the coordinate system of the photographing apparatus, a height of the photographing apparatus is set in the matrix, I is a unit diagonal matrix, and $Z_w$ represents the distance between the photographing apparatus and the target object.

In addition, formula (2) is a formula that is used in this embodiment of this application to determine the distance between the photographing apparatus and the target object and that is obtained by refining and deriving formula (1). The distance Zw between the photographing apparatus and the target object is determined by using formula (2), that is, based on a size of the target in the real world and a size of the target in an imaging plane.

$$Z_w = h^w f_y / (h d_y) \text{ or}$$

$$Z_w = w^w f_x / (w d_x) \qquad (2)$$

$f_x$ and $f_y$ are respectively focal lengths of the photographing apparatus in an x-axis direction and a y-axis direction, $d_x$ and $d_y$ are respectively sizes of a photosensitive unit on the photosensitive element in the x-axis direction and the y-axis direction, $w^w$ and $h^w$ are respectively a width and a height of the target in the real world, w and h are an imaging width and an imaging height, and $Z_w$ is the distance between the target object and the photographing apparatus.

Step 2: Determine the second location region in the image based on the distance between the photographing apparatus and the target object, the size of the object corresponding to the detected category in the real world, the distance between the photographing apparatus and the reference plane, and the boundary coordinates of the first location region and based on an assumption constraint of a small object on a road in a road plane.

Specifically, the boundary coordinates of the first location region may be lower boundary coordinates of the first region. The lower boundary coordinates may include a plurality of coordinate points, or may include one coordinate point. When the lower boundary coordinates of the first location region include one coordinate point, the coordinate point may be a midpoint of a lower boundary, or may be a vertex at which a lower boundary and another boundary (such as a left boundary or a right boundary) intersect.

Herein, based on a premise assumption that a small target on the road is on the ground, a location at which the object of the category determined in step S603 is presented in the image may be deduced by using formula (3) and by using the determined distance between the photographing apparatus and the target object, the size of the object corresponding to the detected category in the real world, the distance between the photographing apparatus and the reference plane, and the boundary coordinates of the first location region, and the location is the second location region. In formula (3), a height of the object of the category presented in the image may be determined, and the height is a height in a gravity direction. Then, based on a width-height ratio of the object of the category in the real world, a width of the object of the category presented in the image may be determined. The second location region uses the lower boundary of the first location region as a bottom edge (for example, a midpoint of the lower boundary of the first location region is used as a midpoint of the bottom edge, or one vertex of the lower boundary of the first location region is used as a first start point of the bottom edge), uses the width determined by using formula (3) as widths of a left boundary and a right boundary of the second location region, and uses the determined height as widths of a lower boundary and an upper boundary of the second location region, so that a specific coordinate range of the second location region in the image may be determined.

$$Z_w \begin{bmatrix} u \\ v + \tilde{h} \\ 1 \end{bmatrix} = \begin{bmatrix} f_x/d_x & 0 & u_0 \\ 0 & f_y/d_y & v_0 \\ 0 & 0 & 1 \end{bmatrix} \begin{bmatrix} X_w \\ Y_w + h^w + h_{com} \\ Z_w \end{bmatrix} \qquad (3)$$

Herein, (u, v) is coordinates of a specific fixed point (such as the midpoint of the lower boundary or a vertex of the lower boundary) in the first location region in the image in the image coordinate system, $(X_w, Y_w, Z_w)$ is coordinates of a specific point (such as a point at which a foot of the pedestrian is in contact with the ground or a point at which a tire of a vehicle is in contact with the ground) of the target object in the real world in the world coordinate system, $f_x$ and $f_y$ are respectively focal lengths of the photographing apparatus in an x-axis direction and a y-axis direction in the coordinate system of the photographing apparatus, $d_x$ and $d_y$ are respectively sizes of a photosensitive unit in the photosensitive element in the x-axis direction and the y-axis direction in the coordinate system of the photographing apparatus, $u_0$, $v_0$ are a plane center of the image (coordinates of a central pixel of the image), $h^w$ is the height of the target in the real world, $h_{com}$ is a distance between a photographing plane and a reference plane, and $\tilde{h}$ is an imaging height deduced based on a reference distance and the height of the target. It should be noted that, when the second location region is determined based on formula (3), there is usually a mapping relationship between a specific fixed point (u, v) in the first location region in the image and a specific point $(X_w, Y_w, Z_w)$ of the target object in the real world. In other words, for example, both the point (u, v) in the image and the point $(X_w, Y_w, Z_w)$ in the real world are used to indicate the foot of the target object, or are a location of a same tire for the vehicle.

S607: Detect an error between the first location region and the second location region.

Detecting the error between the first location region and the second location region herein may be: detecting an error between a height of the first location region and a height of the second location region, an error between a width of the first location region and a width of the second location region, or an error between a width-height ratio of the first location region and a width-height ratio of the width of the second location region.

The error between the first location region and the second location region is determined, so that whether the category to which the target object detected in step S603 belongs is accurate may be deduced. When the error between the first location region and the second location region is greater than a preset threshold, it may be considered that the category to which the target object detected in step S603 belongs is not trusted. For example, it is determined in step S603 that the target object in the first location region is a person, the upper boundary and the lower boundary (that is, a height of the person) of the first location region are 200 px, and the upper boundary and the lower boundary (that is, the height of the person) of the second location region determined based on step S605 are 400 px. Alternatively, the left boundary and the right boundary (that is, a width of the person) of the first location region are 80 px, and the left boundary and the right boundary (that is, the width of the person) of the second location region determined based on step S605 are 200 px. In this case, there is a relatively large error between the first location region and the second location region. Therefore, it may be considered that the category to which the target object detected in step S603 belongs is not trusted. When the error between the first location region and the second location region is less than the preset threshold, in other words, there is a relatively small error between the first location region and the second location region, it may be considered that the category to which the target object detected in step S603 belongs is trusted.

S608: Modify the first confidence based on the error between the first location region and the second location region, to obtain a second confidence of the category to which the target belongs.

The second confidence herein is used to indicate whether the category of the target object is trusted. When the error is relatively large, the second confidence may be set to a smaller value. When the error is relatively small, the second confidence may be set to a larger value.

When the second confidence is greater than a preset threshold (for example, 0.7), it may be considered that the category to which the target object detected in step S603 belongs is trusted. When the second confidence is less than or equal to the preset threshold (for example, 0.7), it may be considered that the category to which the target object detected in step S603 belongs is not trusted.

Implementation of step S606 to step S608 in the target detection method in FIG. 6B is specifically described with reference to an application scenario shown in FIG. 7, FIG. 8a, and FIG. 8b.

Figure 7:
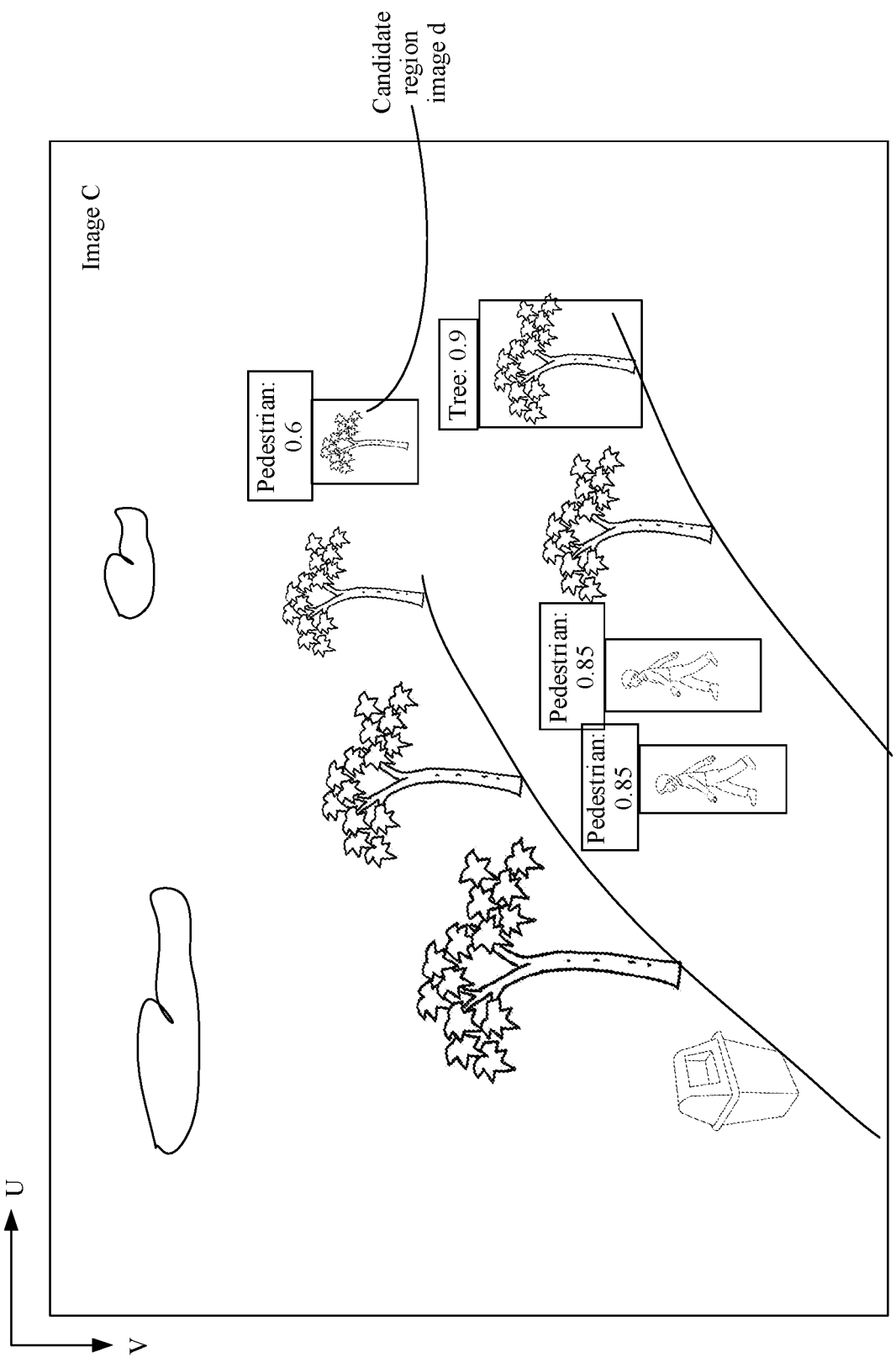
FIG. 7 is a schematic diagram of another application scenario of a target detection method according to an embodiment of this application.

FIG. 7 shows an image C obtained by the photographing apparatus. It is assumed that it is detected by using step S601 to step S605 that a pedestrian is presented in a candidate image region din the image C, and a probability is 0.6. It can be seen from FIG. 7 that an object actually presented in the candidate region d is a tree. Because the candidate region d is relatively far from the photographing apparatus, the tree is a small target on a road, and therefore, misjudging is easily caused. The candidate region d herein is also the first location region. Then, the target detection apparatus may determine a length, in a direction U, of the object presented in the candidate region d. Because it is detected by using step S603 that the object presented in the candidate region d is a pedestrian, in this case, the target detection apparatus may determine a distance between the pedestrian and the photographing apparatus when it is assumed that the object presented in the candidate region d is a pedestrian. Then, the second location region in which the pedestrian is presented in the image is deduced.

Figure 8A:
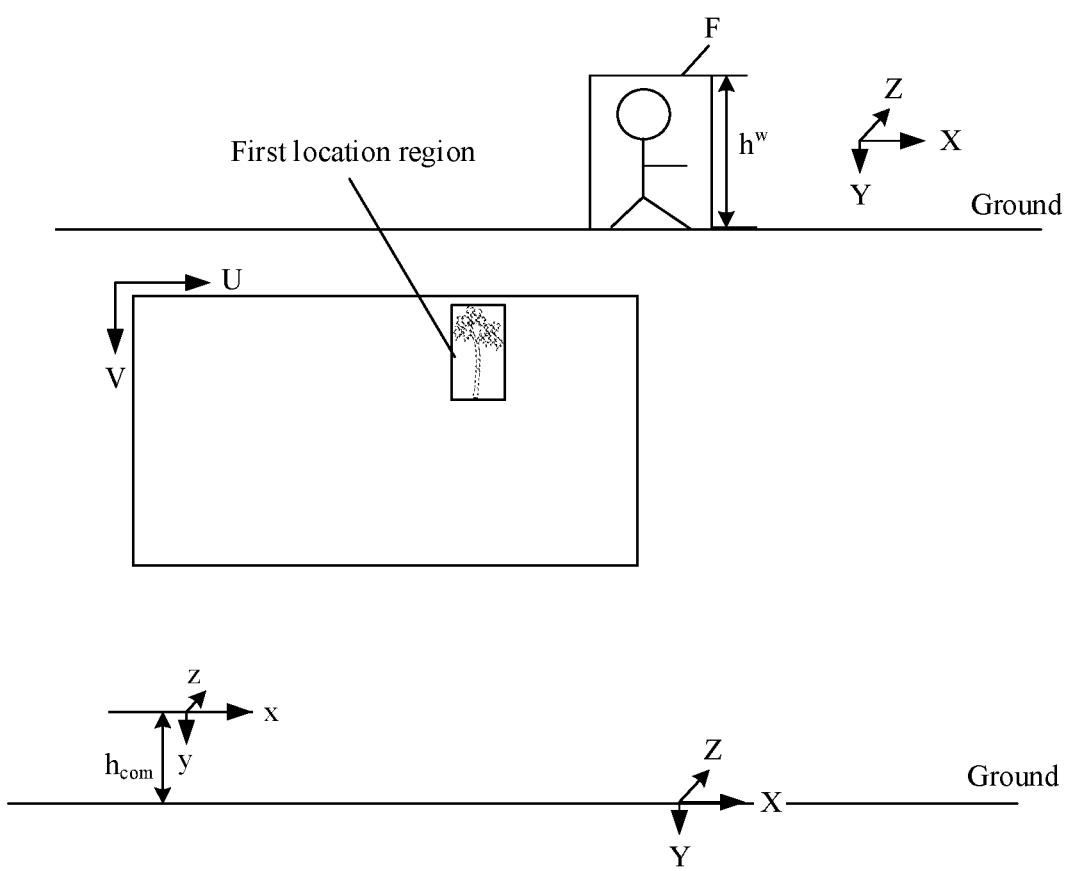
FIG. 8*a* and FIG. 8*b* are schematic diagrams of a method for determining a second location region in the application scenario shown in FIG. 7 according to an embodiment of this application.
Figure 8B:
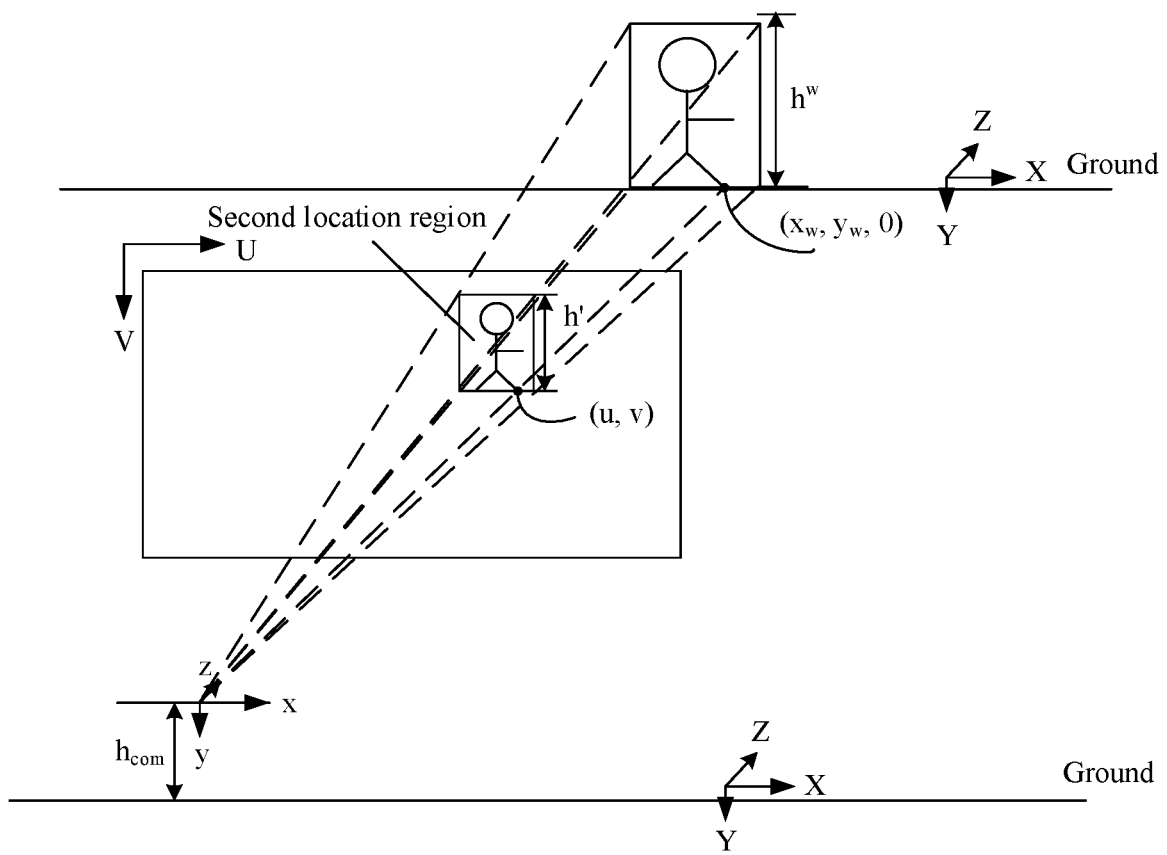

For a manner of determining the second location region, refer to FIG. 8a and FIG. 8b. It is assumed that focal lengths of the photographing apparatus are fx and fy, and a world coordinate system, a camera coordinate system, and an image coordinate system are shown in FIG. 8a. In the world coordinate system, a Y-axis is in a gravity direction, a Z-axis is in a vehicle traveling direction, and an X-axis is in a direction perpendicular to the Y-axis and the Z-axis. The Y-axis in the world coordinate system is mapped to a V-axis in the image coordinate system, and the X-axis in the world coordinate system is mapped to a U-axis in the image coordinate system. The X-axis in the world coordinate system is mapped to an x-axis in the photographing apparatus coordinate system, the Y-axis in the world coordinate system is mapped to a y-axis in the photographing apparatus coordinate system, and the Z-axis in the world coordinate system is mapped to a z-axis in the photographing apparatus coordinate system. In a calculation process, because the image is a two-dimensional coordinate, the Z-axis in the world coordinate system is not taken into consideration in a mapping process. A distance between the photographing apparatus and the ground is $h_{com}$.

It is assumed that the target object presented in the candidate region c is a pedestrian. In this case, a distance between the target object and the photographing apparatus may be deduced by using formula (1) or formula (2). It is assumed that the target object is at a location F shown in FIG. 8a. It should be noted herein that the target object at the location F is assumed and does not necessarily exist in reality. A function of the target object at the location F is to verify correctness of inference of the object presented in the candidate region d in step S603. Then, it may be determined by looking up in a preset table that a height of the pedestrian at the location F is $h^w$. Then, coordinates of a point (Xw, Yw, 0) at which the pedestrian is in contact with the ground in the real world shown in FIG. 8b are selected, the coordinates are mapped to a point (u, v) in the image C, and then, it is determined by using formula (3) that a height of the pedestrian presented in the image C is h'. A second location region of the pedestrian in the image is shown in FIG. 8b.

Then, the target detection apparatus may determine a coordinate difference between the first location region shown in FIG. 8a and the second location region shown in FIG. 8b. It can be seen from FIG. 8a and FIG. 8b that a difference between the first location region and the second location region is relatively large. Therefore, the target detection apparatus may determine, based on the determined difference between the first location region and the second location region, a second confidence of a case in which the target object presented in the first location region detected by the target detection model is a pedestrian. For example, the second confidence may be 0.1.

It may be learned from the target detection method shown in FIG. 6A and FIG. 6B that, different from the target detection method shown in FIG. 3, in this embodiment, when the first confidence is greater than the preset threshold, the second location region is determined, and then a misjudged target object (for example, a tree is misjudged as a pedestrian) is detected based on the error between the first location region and the second location region, so that accuracy of detecting a small target on the road can be further improved.

Based on the foregoing embodiments, in some possible implementations, the method may further include a step of optimizing the target detection model. Specifically, a training sample set is randomly selected, and the training sample set includes a plurality of training sample images. The training sample image is input to the target detection model to obtain a category to which an object in the training sample image belongs and a first location region. Then, a second location region in each sample image is determined by using the method for determining the second location region shown in step S604. Finally, a weight of each layer of the target detection model is iteratively adjusted by using a second preset loss function and a back propagation algorithm, to optimize the target detection model. The second preset loss function is used to indicate a difference between the first location region and the second location region.

Through optimization of the target detection model, detection accuracy of the target detection model can be further improved; in other words, accuracy of road target detection can be improved, and guarantees are provided for obstacle detection, avoidance, and the like of a subsequent autonomous driving vehicle.

Figure 9:
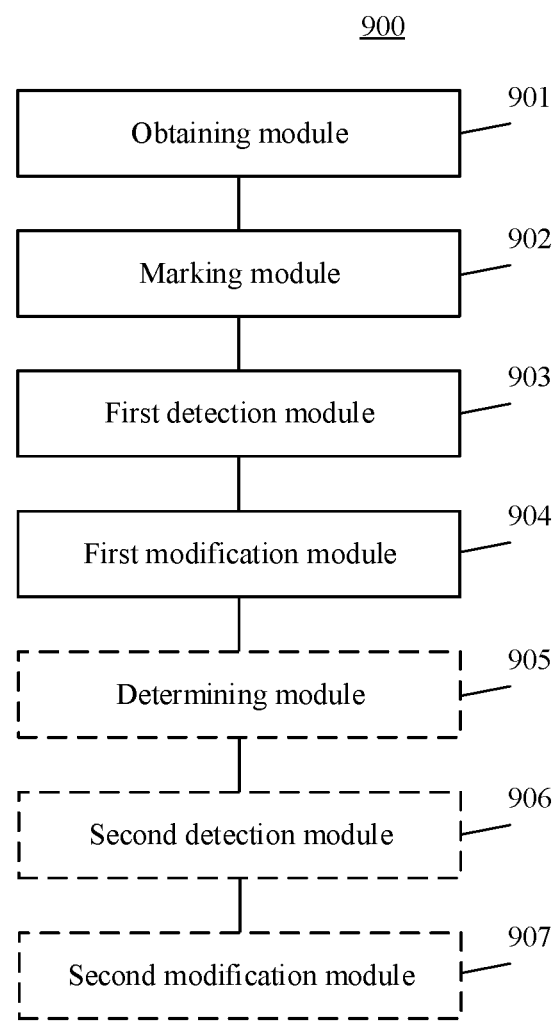
FIG. 9 is a schematic diagram of a target detection apparatus according to an embodiment of this application.

FIG. 9 shows a target detection apparatus 900 according to an embodiment of this application.

As shown in FIG. 9, the target detection apparatus 900 includes: an obtaining module 901, configured to obtain an image by using a photographing apparatus; a marking module 902, configured to mark a region of interest in the image based on a parameter of the photographing apparatus and a preset traveling path; a first detection module 903, configured to detect the image by using a target detection algorithm, to obtain a category to which a target object in the image belongs, a first location region of the target object in the image, and a confidence of the category to which the target object belongs; and a first modification module 904, configured to modify, based on a relative location relationship between the first location region and the region of interest, the confidence of the category to which the target object belongs, to obtain a first confidence.

In addition, the target detection apparatus 900 further includes: a determining module 905, configured to: determine, in response to the fact that the first confidence is greater than a preset threshold, a second location region in the image based on the parameter of the photographing apparatus, boundary coordinates of the first location region in the image, and a preset size of the object corresponding to the category in the real world; a second detection module 906, configured to detect an error between the first location region and the second location region; and a second modification module 907, configured to modify the first confidence based on the error, to obtain a second confidence of the category to which the target belongs.

Further, the parameter of the photographing apparatus includes at least one of the following: a focal length of the photographing apparatus, a distance between the photographing apparatus and a reference plane, a transformation matrix for transforming a coordinate system of the photographing apparatus into an image coordinate system, and a size of a photosensitive unit in a photosensitive element.

Further, the determining module includes: a first determining sub-module, configured to determine a distance between the photographing apparatus and the target object based on the focal length of the photographing apparatus, the distance between the photographing apparatus and the reference plane, the transformation matrix for transforming the coordinate system of the photographing apparatus into the image coordinate system, the size of the photosensitive unit in the photosensitive element, and the boundary coordinates of the first location region in the image; and a second determining sub-module, configured to determine the second location region in the image based on the distance between the photographing apparatus and the target object, the size of the object corresponding to the detected category in the real world, the distance between the photographing apparatus and the reference plane, and the boundary coordinates of the first location region.

Further, the category to which the target object belongs is selected from preset candidate categories based on a matching result obtained after matching a feature of the target object with features of a plurality of objects corresponding to the preset candidate categories.

Further, the first detection module includes: a setting sub-module, configured to set a marking parameter in a pre-trained target detection model, where the marking parameter is used to indicate that the target detection model marks a plurality of candidate regions in the image; and a detection sub-module, configured to input the image to the target detection model to obtain an output result of the target detection model, where the output result is used to indicate whether an object of the preset candidate category and the confidence of the category to which the target object belongs are presented in each candidate region, and the target detection model is obtained by training a neural network based on a training sample and a marking parameter used to mark the candidate region.

Further, the plurality of candidate regions in the image are pre-determined based on a constraint condition. The constraint condition includes: a region range in which an object corresponding to each preset candidate category is presented in the image and an imaging size range of the object corresponding to each preset candidate category in the image.

Further, the setting sub-module is specifically configured to: mark initial candidate regions in the image; and screen the initial candidate regions by using the constraint condition, and obtain the plurality of candidate regions based on a screening result.

Further, the target detection apparatus further includes a model optimization module, and the model optimization module is specifically configured to: obtain a training sample set, where the training sample set includes a plurality of sample images, and a target object is presented in each sample image; input the sample image to the target detection model, to obtain a category to which the target object in each sample image belongs and a first location region of the target object in the sample image, and determine a second location region in each sample image based on the category to which the target object in the sample image belongs, boundary coordinates of the first location region, and a parameter of a photographing device used to shoot the sample image; and determine a deviation between the first location region and the second location region in each training sample by using a preset loss function, and iteratively adjust the target detection model based on the deviation to obtain an optimized target detection model.

It should be noted that content such as information exchange and an execution process between the foregoing apparatuses is based on a same concept as that in the method embodiments of this application. For a specific function and technical effects of the apparatus, refer to the part of the method embodiments. Details are not described herein again.

When an integrated module is used, the target detection apparatus 900 may include a processor, a memory, and a communication module. The processor may control and manage an action of the target detection apparatus 900. For example, the processor may be configured to support the target detection apparatus 900 in performing steps performed by the foregoing modules. The memory may be configured to support the target detection apparatus 900 in executing stored program code, data, and the like. The communication module may be used by the target detection apparatus 900 to communicate with another device.

The processor may implement or execute various example logic modules described with reference to the content disclosed in this application. The processor may alternatively be a combination that implements a computing function, for example, includes one or more microprocessor combinations, for example, includes a central processing unit (Central Processing Unit, CPU), and may further include another general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The general-purpose processor may be a microprocessor, a microcontroller, any conventional processor, or the like.

It may be further understood that the memory mentioned in embodiments of this application may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (random access memory, RAM) and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

The communication module may be specifically a device that interacts with another electronic device, such as a radio frequency circuit, a Bluetooth chip, or a Wi-Fi chip.

An embodiment of this application further provides a computer-readable storage medium. The computer-readable storage medium stores computer instructions. When the computer instructions are run on a computer, the computer is enabled to perform related method steps to implement the temperature measurement method in the foregoing method embodiments.

An embodiment further provides a computer program product. When the computer program product is run on a computer, the computer is enabled to perform the foregoing related steps to implement the temperature measurement method in the foregoing method embodiments.

In addition, an embodiment of this application further provides an apparatus. The apparatus may be specifically a chip, a component, or a module. The apparatus may include a processor and a memory that are coupled. The memory is configured to store computer-executable instructions. When the apparatus is running, the processor may execute the computer-executable instructions stored in the memory, so that the chip performs the foregoing temperature measurement method.

The processor, the computer-readable storage medium, the computer program product, and the chip provided in the embodiments are all used to perform the foregoing corresponding method. Therefore, for beneficial effects that can be achieved by the processor, the computer-readable storage medium, the computer program product, and the chip, refer to beneficial effects in the corresponding method provided above. Details are not described herein again.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiment is merely an example. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing readable storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A target detection method, wherein the method comprises:
   obtaining an image by using a photographing apparatus;
   marking a region of interest in the image based on a parameter of the photographing apparatus and a preset traveling path, wherein marking the region of interest comprises determining boundary coordinates of the region of interest in the image;
   detecting a target object in the image by using a target detection algorithm to obtain a category to which the target object in the image belongs, a first location region of the target object in the image, and a confidence of the category;
   modifying, based on a relative location relationship between the first location region and the region of interest, the confidence of the category to obtain a first confidence;
   in response to the first confidence being greater than a preset threshold, determining a second location region in the image based on the parameter of the photographing apparatus, boundary coordinates of the first location region in the image, and a preset size of an object corresponding to the category;
   detecting an error between the first location region and the second location region; and
   modifying the first confidence based on the error to obtain a second confidence of the category.

2. The target detection method according to claim 1, wherein the parameter of the photographing apparatus comprises at least one of the following: a focal length of the photographing apparatus, a distance between the photographing apparatus and a reference plane, a transformation matrix for transforming a coordinate system of the photographing apparatus into an image coordinate system, or a size of a photosensitive unit in a photosensitive element.

3. The target detection method according to claim 2, wherein the determining a second location region in the image based on the parameter of the photographing apparatus, boundary coordinates of the first location region in the image, and a preset size of the object corresponding to the category comprises:
   determining a distance between the photographing apparatus and the target object based on the focal length of the photographing apparatus, the distance between the photographing apparatus and the reference plane, the transformation matrix for transforming the coordinate system of the photographing apparatus into the image coordinate system, the size of the photosensitive unit in the photosensitive element, and the boundary coordinates of the first location region in the image; and
   determining the second location region in the image based on the distance between the photographing apparatus and the target object, the size of the object corresponding to the category, the distance between the photographing apparatus and the reference plane, and the boundary coordinates of the first location region.

4. The target detection method according to claim 1, wherein the category is selected from preset candidate categories based on a matching result obtained after matching a feature of the target object with features of a plurality of objects corresponding to the preset candidate categories.

5. The target detection method according to claim 4, wherein the detecting the image, by using a target detection algorithm, to obtain a category to which a target object in the image belongs, a first location region of the target object in the image, and a confidence of the category comprises:
   setting a marking parameter in a pre-trained target detection model, wherein the marking parameter indicates that the target detection model marks a plurality of candidate regions in the image; and
   inputting the image to the target detection model to obtain an output result of the target detection model, wherein the output result indicates whether an object of a preset candidate category and the confidence of the category are presented in each candidate region, and the target detection model is obtained by training a neural network based on a training sample set and an additional marking parameter used to mark candidate regions.

6. The target detection method according to claim 5, wherein the plurality of candidate regions in the image are pre-determined based on a constraint condition, and wherein the constraint condition comprises: a region range in which an object corresponding to each preset candidate category is presented in the image and an imaging size range of the object corresponding to each preset candidate category in the image.

7. The target detection method according to claim 6, comprising:
   determining the plurality of candidate regions in the image, wherein the determining the plurality of candidate regions in the image comprises:
      marking initial candidate regions in the image;
      screening the initial candidate regions by using the constraint condition; and
      obtaining the plurality of candidate regions based on a screening result.

8. The target detection method according to claim 5, wherein the method further comprises:
   obtaining a training sample set, wherein the training sample set comprises a plurality of sample images, and a target object is presented in each sample image;
   inputting the sample image to the target detection model, to obtain a category to which the target object in each sample image belongs and a first location region of the target object in the sample image;
   determining a second location region in each sample image based on the category to which the target object in the sample image belongs, boundary coordinates of the first location region, and a parameter of a photographing device used to shoot the sample image;
   determining a deviation between the first location region and the second location region in each training sample by using a preset loss function; and
   iteratively adjusting the target detection model based on the deviation to obtain an optimized target detection model.

9. An apparatus, comprising:
   at least one processor; and
   one or more memories coupled to the at least one processor and storing programming instructions for execution by the at least one processor to:
      obtain an image by using a photographing apparatus;
      mark a region of interest in the image based on a parameter of the photographing apparatus and a preset traveling path by determining boundary coordinates of the region of interest in the image;
      detect a target object in the image by using a target detection algorithm to obtain a category to which the target object in the image belongs, a first location region of the target object in the image, and a confidence of the category;

modify, based on a relative location relationship between the first location region and the region of interest, the confidence of the category to obtain a first confidence;

in response to the first confidence being greater than a preset threshold, determine a second location region in the image based on the parameter of the photographing apparatus, boundary coordinates of the first location region in the image, and a preset size of an object corresponding to the category;

detect an error between the first location region and the second location region; and modify the first confidence based on the error to obtain a second confidence of the category.

10. The apparatus according to claim 9, wherein the parameter of the photographing apparatus comprises at least one of the following: a focal length of the photographing apparatus, a distance between the photographing apparatus and a reference plane, a transformation matrix for transforming a coordinate system of the photographing apparatus into an image coordinate system, or a size of a photosensitive unit in a photosensitive element.

11. The apparatus according to claim 10, wherein the programming instructions are for execution by the at least one processor to determine the second location region:

determine a distance between the photographing apparatus and the target object based on the focal length of the photographing apparatus, the distance between the photographing apparatus and the reference plane, the transformation matrix for transforming the coordinate system of the photographing apparatus into the image coordinate system, the size of the photosensitive unit in the photosensitive element, and the boundary coordinates of the first location region in the image; and determine the second location region in the image based on the distance between the photographing apparatus and the target object, the size of the object corresponding to the category, the distance between the photographing apparatus and the reference plane, and the boundary coordinates of the first location region.

12. The apparatus according to claim 9, wherein the category is selected from preset candidate categories based on a matching result obtained after matching a feature of the target object with features of a plurality of objects corresponding to the preset candidate categories.

13. The apparatus according to claim 12, wherein the programming instructions are for execution by the at least one processor to detect the target object in the image by using the target detection algorithm:

set a marking parameter in a pre-trained target detection model, wherein the marking parameter indicates that the target detection model marks a plurality of candidate regions in the image; and input the image to the target detection model to obtain an output result of the target detection model, wherein the output result indicates whether an object of a preset candidate category and the confidence of the category are presented in each candidate region, and the target detection model is obtained by training a neural network based on a training sample set and an additional marking parameter used to mark candidate regions.

14. The apparatus according to claim 13, wherein the plurality of candidate regions in the image are pre-determined based on a constraint condition, and wherein the constraint condition comprises: a region range in which an object corresponding to each preset candidate category is presented in the image and an imaging size range of the object corresponding to each preset candidate category in the image.

15. The apparatus according to claim 14, wherein the programming instructions are for execution by the at least one processor to:

determine the plurality of candidate regions in the image, in which the programming instructions are for execution by the at least one processor to:

mark initial candidate regions in the image;

screen the initial candidate regions by using the constraint condition; and obtain the plurality of candidate regions based on a screening result.

16. The apparatus according to claim 15, wherein the programming instructions are for execution by the at least one processor to:

obtain a training sample set, wherein the training sample set comprises a plurality of sample images, and a target object is presented in each sample image;

input the sample image to the target detection model, to obtain a category to which the target object in each sample image belongs and a first location region of the target object in the sample image;

determine a second location region in each sample image based on the category to which the target object in the sample image belongs, boundary coordinates of the first location region, and a parameter of a photographing device used to shoot the sample image;

determine a deviation between the first location region and the second location region in each training sample by using a preset loss function; and iteratively adjust the target detection model based on the deviation to obtain an optimized target detection model.

17. A non-transitory computer-readable storage medium storing programming instructions for execution by at least one processor, that when executed by the at least one processor, cause a computer to perform operations comprising:

obtaining an image by using a photographing apparatus;

marking a region of interest in the image based on a parameter of the photographing apparatus and a preset traveling path, wherein marking the region of interest comprises determining boundary coordinates of the region of interest in the image;

detecting a target object in the image by using a target detection algorithm to obtain a category to which the target object in the image belongs, a first location region of the target object in the image, and a confidence of the category;

modifying, based on a relative location relationship between the first location region and the region of interest, the confidence of the category to obtain a first confidence; and in response to the first confidence being greater than a preset threshold, determining a second location region in the image based on the parameter of the photographing apparatus, boundary coordinates of the first location region in the image, and a preset size of an object corresponding to the category;

detecting an error between the first location region and the second location region; and modifying the first confidence based on the error to obtain a second confidence of the category.

18. The non-transitory computer-readable storage medium according to claim 17, wherein the parameter of the photographing apparatus comprises at least one of the following: a focal length of the photographing apparatus, a distance between the photographing apparatus and a reference plane, a transformation matrix for transforming a coordinate system of the photographing apparatus into an image coordinate system, or a size of a photosensitive unit in a photosensitive element.

19. The non-transitory computer-readable storage medium according to claim 18, wherein the determining a second location region in the image based on the parameter of the photographing apparatus, boundary coordinates of the first location region in the image, and a preset size of the object corresponding to the category comprises:

determining a distance between the photographing apparatus and the target object based on the focal length of the photographing apparatus, the distance between the photographing apparatus and the reference plane, the transformation matrix for transforming the coordinate system of the photographing apparatus into the image coordinate system, the size of the photosensitive unit in the photosensitive element, and the boundary coordinates of the first location region in the image; and determining the second location region in the image based on the distance between the photographing apparatus and the target object, the size of the object corresponding to the category, the distance between the photographing apparatus and the reference plane, and the boundary coordinates of the first location region.

20. The non-transitory computer-readable storage medium according to claim 17, wherein the category is selected from preset candidate categories based on a matching result obtained after matching a feature of the target object with features of a plurality of objects corresponding to the preset candidate categories.

\* \* \* \* \*